United States Patent [19]

Willingham et al.

[11] Patent Number: 5,133,663
[45] Date of Patent: Jul. 28, 1992

[54] PORTABLE AUTOMATIC RADAR SIMULATOR

[75] Inventors: Joseph A. Willingham, Ventura, Calif.; Robert A. Hedin, Lawai, Hi.

[73] Assignee: The United States of America as represented by the Secretary of the Navy, Washington, D.C.

[21] Appl. No.: 824,959

[22] Filed: Feb. 27, 1992

[51] Int. Cl.$^5$ .................... G09B 9/40; G01S 7/40
[52] U.S. Cl. ........................ 434/2; 342/169; 342/170; 342/171; 342/13
[58] Field of Search .............. 434/2; 342/169, 170, 342/171, 172, 13, 14

[56] References Cited

U.S. PATENT DOCUMENTS

| | | | |
|---|---|---|---|
| 4,667,199 | 5/1987 | Roberts | 342/169 |
| 4,694,299 | 9/1987 | Huntley | 342/170 |
| 4,730,191 | 3/1988 | Groeble | 342/169 |
| 4,737,792 | 4/1988 | Grone | 342/169 |
| 4,959,015 | 9/1990 | Rasinski et al. | 434/2 |
| 4,969,819 | 11/1990 | James | 434/5 |
| 4,982,196 | 1/1991 | Thomas et al. | 342/172 |
| 5,010,342 | 4/1991 | Jones, Jr. | 342/169 |
| 5,064,376 | 11/1991 | DeCrescent | 434/2 |

Primary Examiner—John B. Sotomayor
Attorney, Agent, or Firm—David S. Kalmbaugh; Melvin J. Sliwka

[57] ABSTRACT

A portable radar simulator which when connected to a transmitting means such as a magnetron generated microwave threat transmitter simulates up to 2048 pre-programmed radar signatures. The portable radar simulator comprises a replaceable Erasable Programmable Read Only Memory (EPROM) which will hold up to 2048 pre-programmed radar signatures. Selection of a particular radar threat to be simulated is entered by an operator via thumbwheel switches located on the front panel of the simulator. The portable radar simulator simulates such radar parameters as jitter, stagger, frequency hop, simple and complex scans, pulse repetition intervals and frequency pulse widths.

15 Claims, 13 Drawing Sheets

| THR NUM | JI | SC | FH | PW | PRF pul/s | BW1 ms | SCAN 1 ms | BW 2 ms | SCAN 2 ms | BW 3 ms | SCAN 3 ms | BW 4 ms | SCAN 4 ms | BW 5 ms | SCAN 5 ms | BW 6 ms | SCAN 6 ms |
|---|---|---|---|---|---|---|---|---|---|---|---|---|---|---|---|---|---|
| 000 | 0 | D | N | 4 | 1000 | 0 | 0 | 0 | 0 | 0 | 0 | 0 | 0 | 0 | 0 | 0 | 0 |
| 001 | 1 | D | N | 4 | 1000 | 0 | 0 | 0 | 0 | 0 | 0 | 0 | 0 | 0 | 0 | 0 | 0 |
| 002 | 2 | D | N | 4 | 1000 | 0 | 0 | 0 | 0 | 0 | 0 | 0 | 0 | 0 | 0 | 0 | 0 |
| 003 | 3 | D | N | 4 | 1000 | 0 | 0 | 0 | 0 | 0 | 0 | 0 | 0 | 0 | 0 | 0 | 0 |
| 004 | 4 | D | N | 4 | 1000 | 0 | 0 | 0 | 0 | 0 | 0 | 0 | 0 | 0 | 0 | 0 | 0 |
| 005 | 5 | D | N | 4 | 1000 | 0 | 0 | 0 | 0 | 0 | 0 | 0 | 0 | 0 | 0 | 0 | 0 |
| 006 | 0 | A | N | 4 | 1000 | 50 | 1000 | 50 | 1000 | 50 | 1000 | 50 | 1000 | 50 | 1000 | 50 | 1000 |
| 007 | 0 | B | N | 4 | 1000 | 89 | 200 | 89 | 1800 | 89 | 200 | 89 | 1800 | 89 | 200 | 89 | 1800 |
| 008 | 0 | B | N | 4 | 1000 | 89 | 400 | 89 | 1600 | 89 | 400 | 89 | 1600 | 89 | 400 | 89 | 1600 |
| 009 | 0 | B | N | 4 | 1000 | 89 | 700 | 89 | 1300 | 89 | 700 | 89 | 1300 | 89 | 700 | 89 | 1300 |
| 00A | 0 | B | N | 4 | 1000 | 89 | 1000 | 89 | 1000 | 89 | 1000 | 89 | 1000 | 89 | 1000 | 89 | 1000 |
| 00B | 0 | F | N | 4 | 1000 | 50 | 100 | 50 | 100 | 50 | 100 | 50 | 100 | 50 | 100 | 50 | 1000 |
| 00C | 0 | F | N | 4 | 1000 | 50 | 400 | 50 | 800 | 50 | 400 | 50 | 800 | 50 | 400 | 50 | 800 |
| 00D | 4 | D | Y | 4 | 1000 | 0 | 0 | 0 | 0 | 0 | 0 | 0 | 0 | 0 | 0 | 0 | 0 |
| 00E | 0 | D | P | 4 | 1000 | 0 | 0 | 0 | 0 | 0 | 0 | 0 | 0 | 0 | 0 | 0 | 0 |
| 00F | 0 | F | N | 4 | 1000 | 50 | 100 | 50 | 100 | 50 | 600 | 50 | 100 | 50 | 100 | 50 | 1500 |
| 010 | 0 | F | N | 4 | 1000 | 5 | 100 | 5 | 100 | 5 | 100 | 5 | 100 | 5 | 100 | 5 | 100 |
| 011 | 0 | F | N | 4 | 1000 | 25 | 75 | 25 | 75 | 25 | 75 | 25 | 75 | 25 | 75 | 25 | 75 |
| 012 | 0 | F | N | 4 | 1000 | 50 | 100 | 50 | 100 | 50 | 100 | 50 | 100 | 50 | 100 | 50 | 100 |
| 013 | 0 | F | N | 4 | 1000 | 75 | 100 | 75 | 100 | 75 | 100 | 75 | 100 | 75 | 100 | 75 | 100 |
| 014 | 0 | D | N | 4 | 1000 | 0 | 0 | 0 | 0 | 0 | 0 | 0 | 0 | 0 | 0 | 0 | 0 |

*Fig. 10.*

| THR NUM | CONTROL WORD 01 | SPARE 02 | LSB (PRI) 03 | MSB (PRI) 04 | BW 1 05 | SCAN 1 06 | BW2 07 | S2 08 | BW3 09 | S3 10 | BW4 11 | S4 12 | BW5 13 | S5 14 | BW6 15 | S6 16 |
|---|---|---|---|---|---|---|---|---|---|---|---|---|---|---|---|---|
| 000 | 84 | 00 | 34 | F8 | 00 | 80 | 00 | 80 | 00 | 80 | 00 | 80 | 00 | 80 | 00 | 80 |
| 001 | A4 | 00 | 34 | F8 | 00 | 80 | 00 | 80 | 00 | 80 | 00 | 80 | 00 | 80 | 00 | 80 |
| 002 | 94 | 00 | 34 | F8 | 00 | 80 | 00 | 80 | 00 | 80 | 00 | 80 | 00 | 80 | 00 | 80 |
| 003 | B4 | 00 | 34 | F8 | 00 | 80 | 00 | 80 | 00 | 80 | 00 | 80 | 00 | 80 | 00 | 80 |
| 004 | C4 | 00 | 34 | F8 | 00 | 80 | 00 | 80 | 00 | 80 | 00 | 80 | 00 | 80 | 00 | 80 |
| 005 | F4 | 00 | 34 | F8 | 00 | 80 | 00 | 80 | 00 | 80 | 00 | 80 | 00 | 80 | 00 | 80 |
| 006 | 04 | 00 | 34 | F8 | 4F | 78 | 4F | 78 | 4F | 78 | 4F | 78 | 4F | 78 | 4F | 78 |
| 007 | 04 | 00 | 34 | F8 | 29 | C9 | 29 | 72 | 29 | 29 | 29 | 72 | 29 | 29 | 29 | 72 |
| 008 | 04 | 00 | 34 | F8 | 29 | 7D | 29 | 74 | 29 | 7D | 29 | 74 | 29 | 7D | 29 | 74 |
| 009 | 04 | 00 | 34 | F8 | 29 | 7B | 29 | 76 | 29 | 7B | 29 | 76 | 29 | 7B | 29 | 76 |
| 00A | 04 | 00 | 34 | F8 | 29 | 79 | 29 | 79 | 29 | 79 | 29 | 79 | 29 | 79 | 29 | 79 |
| 00B | 04 | 00 | 34 | F8 | 4F | E7 | 4F | E7 | 4F | E7 | 4F | E7 | 4F | E7 | 4F | 78 |
| 00C | 44 | 00 | 34 | F8 | 4F | 7D | 4F | 7A | 4F | 7D | 4F | 7A | 4F | 7D | 4F | 7A |
| 00D | 8C | 00 | 34 | F8 | 00 | 80 | 00 | 80 | 00 | 80 | 00 | 80 | 00 | 80 | 00 | 80 |
| 00E | 85 | 00 | 34 | F8 | 00 | 80 | 00 | 80 | 00 | 80 | 00 | 80 | 00 | 80 | 00 | 80 |
| 00F | 04 | 00 | 34 | F8 | 4F | E7 | 4F | E7 | 4F | 78 | 4F | E7 | 4F | E7 | 4F | 74 |
| 010 | 04 | 00 | 34 | F8 | 7B | D1 | 7B | D1 | 7B | D1 | 7B | D1 | 7B | D1 | 7B | D1 |
| 011 | 04 | 00 | 34 | F8 | 67 | E7 | 67 | E7 | 67 | E7 | 67 | E7 | 67 | E7 | 67 | E7 |
| 012 | 04 | 00 | 34 | F8 | 4F | E7 | 4F | E7 | 4F | E7 | 4F | E7 | 4F | E7 | 4F | E7 |
| 013 | 04 | 00 | 34 | F8 | 36 | F3 | 36 | F3 | 36 | F3 | 36 | F3 | 36 | F3 | 36 | F3 |
| 014 | 84 | 00 | 34 | F8 | 00 | 80 | 00 | 80 | 00 | 80 | 00 | 80 | 00 | 80 | 00 | 80 |

HEXA-DECIMA-

Fig. 11.

PORTABLE AUTOMATIC RADAR SIMULATOR

BACKGROUND OF THE INVENTION

1. Field of the Invention

The present invention relates generally to simulators. In particular, the present invention relates to a portable radar simulator which when connected to a microwave transmitter will effectively simulate up to 2048 radar systems.

2. Description of the Prior Art

Man has engaged in war on the land, in the sea, in the air and in the electromagnetic spectrum. The electromagnetic spectrum has been used by the military for improved communications, the guidance of aircraft and missiles and the navigation of ships and planes. A nation seeks control of the electromagnetic spectrum because of the military's increasing dependency on its use for surveillance of potential enemy forces, communications between military units, detection of enemy military forces and the guidance and control of aeroplanes and missiles. With a mastery of the electromagnetic spectrum one adversary could achieve an indispensable ingredient for conquering an enemy or discouraging a potential aggressor.

There are two types of electronic warfare equipment, active and passive. Active equipment radiates its own energy whereas passive equipment does not. The passive category includes reconnaissance or surveillance equipment that detects and analyzes the electromagnetic radiation that is produced by radar and communications transmitters aboard aircraft, missiles, ships, satellites and ground installations. The reconnaissance devices may be used to identify and map the location of the emitters without in any way altering the nature of the signal they receive.

Certain types of passive electronic warfare systems enhance or change the nature of the electromagnetic energy reflected back to the enemy radars without generating any signal of their own. Active electronic warfare systems generate energy or delay the received signals to confuse the enemy's electromagnetic sensors.

A radar warning receiver is a passive type of electronic warfare equipment which is not used over the entire range of the electromagnetic spectrum. The radar warning receiver alerts the pilot or ship's captain that his aircraft or ship is being illuminated by a specific radar signal. Once the pilot or captain has been alerted that his vehicle has been detected by radar he can maneuver his vehicle to evade the threat or initiate certain electronic warfare countermeasures. Electronic warfare countermeasures include all actions taken by the pilot or ship's captain to nullify the effective operation of the enemy's electronic warfare equipment. Some electronic countermeasures used are jamming the enemy's signal, the dropping of chaff and the launching of decoys.

Electronic warfare equipment is expensive, complex and difficult to learn how to operate. Simulators and other training devices have been invented to teach students to use and operate various types of equipment without undergoing the dangers that are inherent in the equipment's actual operation. For instance, it is a great deal safer and more economical to learn how to operate electronic warfare equipment on the ground in a simulator than in an actual aircraft or ship. Simulators streamline and cut the cost of training by allowing more intensive training time by permitting an instructor to control the various conditions that exists in the system being simulated. The instructor may make the student believe that enemy radar is looking at his airplane or ship or that a surface to air missile has been fired at his ship or airplane. The instructor observes and monitors the student's performance in handling the adverse conditions that are presented to him. If a student makes a mistake and does not take the proper countermeasures to avoid the surface to air missile, the student is not hurt and no damage is done to any property.

The systems used in the prior art do not simulate all the characteristics of different types of radar that the pilot or ship's captain might see. Systems used in the prior art did not stimulate the analyzer characteristics of the aircraft's radar warning receivers and additional hardware was required when the signal strength of various radar emitters needed to be changed. Further systems of the prior art are generally very expensive and require highly trained and skilled operators to operate them and train student pilot and ship captains.

SUMMARY OF THE INVENTION

The present invention overcomes the disadvantages of the prior art including those mentioned above in that it comprises a relatively simple yet highly efficient portable radar simulator which when connected to a transmitting means such as a magnetron generated microwave threat transmitter will simulate up to 2048 pre-programmed radar signatures. The portable radar simulator of the present invention comprises a replaceable Erasable Programmable Read Only Memory (EPROM) which will hold up to 2048 pre-programmed radar signatures. Selection of a particular radar threat to be simulated is entered by an operator via thumbwheel switches located on the front panel of the simulator. This addresses the eleven most significant bits (MSB) of the EPROM. The four least significant bits (LSB) come from a sequencer counter circuit for a total address of 15 bits. The sequencer counter is reset to zero by a transmit switch being thrown to "off" while the proper thumbwheel setting is selected. A 1 of 16 decoder in the sequencer counter circuit is used to gate 16 8-bit data words out of the EPROM and into the proper registers and counters for a particular thumbwheel setting.

The first word to be gated out of the EPROM is the control word. These eight bits are loaded into a control register as follows:

BIT 1 (LSB) PULSE GROUP OUTPUT
BIT 2 MOST SIGNIFICANT PULSE WIDTH BIT
BIT 3 LEAST SIGNIFICANT PULSE WIDTH BIT
BIT 4 FREQUENCY HOP
BIT 5 PRI STAGGER 128 MICROSEC
BIT 6 PRI STAGGER 64 MICROSEC
BIT 7 JITTER
BIT 8 (MSB) DIRECT SCAN

The second word from the sequencer counter circuit is a spare word and reserved for frequency. This third word is the eight least significant bits of the Pulse Repetition Interval (PRI). The fourth sequencer pulse provided by the sequencer counter circuit loads in the eight most significant bits of the PRI. The sequencer pulses are stepped by a 2 microsecond clock. The PRI data words are loaded into four storage registers and then transferred to four counters. The PRI number is determined to give the correct timing when counted up at a 0.5 microsecond rate. A ripple output pulse train is then gated through a output gating circuit to at least one of a pair of power amplifier.

Connected to the PRI counter is a Jitter/Stagger gating circuit. The present invention can accommodate different stagger settings by adding or subcontracting jumpers. The portable radar simulator is capable of producing staggers of either 15, 32, 64, or 128 microseconds. Presently, the jumpers are set for a stagger of 64 and 128 microseconds. If the control word indicates a 64 microsecond stagger, then on every other PRI counter overflow pulse, gating recognizes when the counter is 64 microseconds from overflow and puts a pulse out to an amplifier and resets the PRI counter. Different gating recognizes 128 microseconds before overflow if that particular control bit is set. If both the 64 and 128 bits are set, then the PRI pulse train will be normal for two cycles, then will be shortened by 64 microseconds for one cycle, followed by a shortened period of 128 microseconds for another cycle, with the entire process being repeated.

The remaining twelve sequencer outputs gate six beamwidth and six scan words from the EPROM into a scan/lobe counter at a predetermined time. The fifth word is the first beamwidth. When the binary number representing the desired beamwidth is loaded into the scan/lobe counter, the sequencer is inhibited from stepping until the beamwidth counter generates an overflow. The beamwidth is counted at a 1.024 microsecond rate. All during this beamwidth or lobe cycle, the PRI overflow pulse is being gated to the output power amplifiers. The most significant bit of the lobe word is the attenuation signal. The overflow causes the sequencer to step and then load the sixth word, or first scan word into the scan/lobe counter. The most significant bit of the scan word is used to select either a 131.072 millisecond clock rate or a 2.048 millisecond scan counting rate if the scan is below 263 milliseconds. The overflow from the cycle steps the sequencer which now loads the seventh word which is the second lobe duration. This time sharing of the scan/lobe counter continues until the final scan duration (the sixteenth output from the sequencer) has been counted to overflow. This will result in six lobes or beamwidths and six scan periods. Complete flexibility is possible with the present invention with all beamwidths or all scans being exactly the same for circular scans or different for bi-directional, complex, side lobes or the like. After the final scan duration the complete sequencer cycle repeats starting with the reloading of the control word. Normally this will result in the same pattern being generated unless the thumbwheels have been changed.

A frequency hop generator, combined with the output gating, routes an output pulse alternately between the first power output amplifier and the second output power amplifier. If these outputs are connected to two threat transmitters that have their magnetrons tuned to different frequencies providing a pulse repetition frequency that is twice the output of a single magnetron, it will appear to be a frequency hopping radar jumping between two different frequencies. If the magnetrons are adjusted to the same frequency, then the duty cycle limit can be doubled. These same two amplifiers can also be used to simulate a pulse group type PRI by triggering amplifier two with a pulse that is delayed by 10 microseconds after amplifier one's pulse.

BRIEF DESCRIPTION OF THE DRAWINGS

FIG. 10 is a Table illustrating in base ten the operation of the Portable Automatic Radar Simulator; and FIG. 11 is a Table illustrating in hexadecimal the operation of the Portable Automatic Radar Simulator;

DETAILED DESCRIPTION OF THE PREFERRED EMBODIMENT

Figure 1:
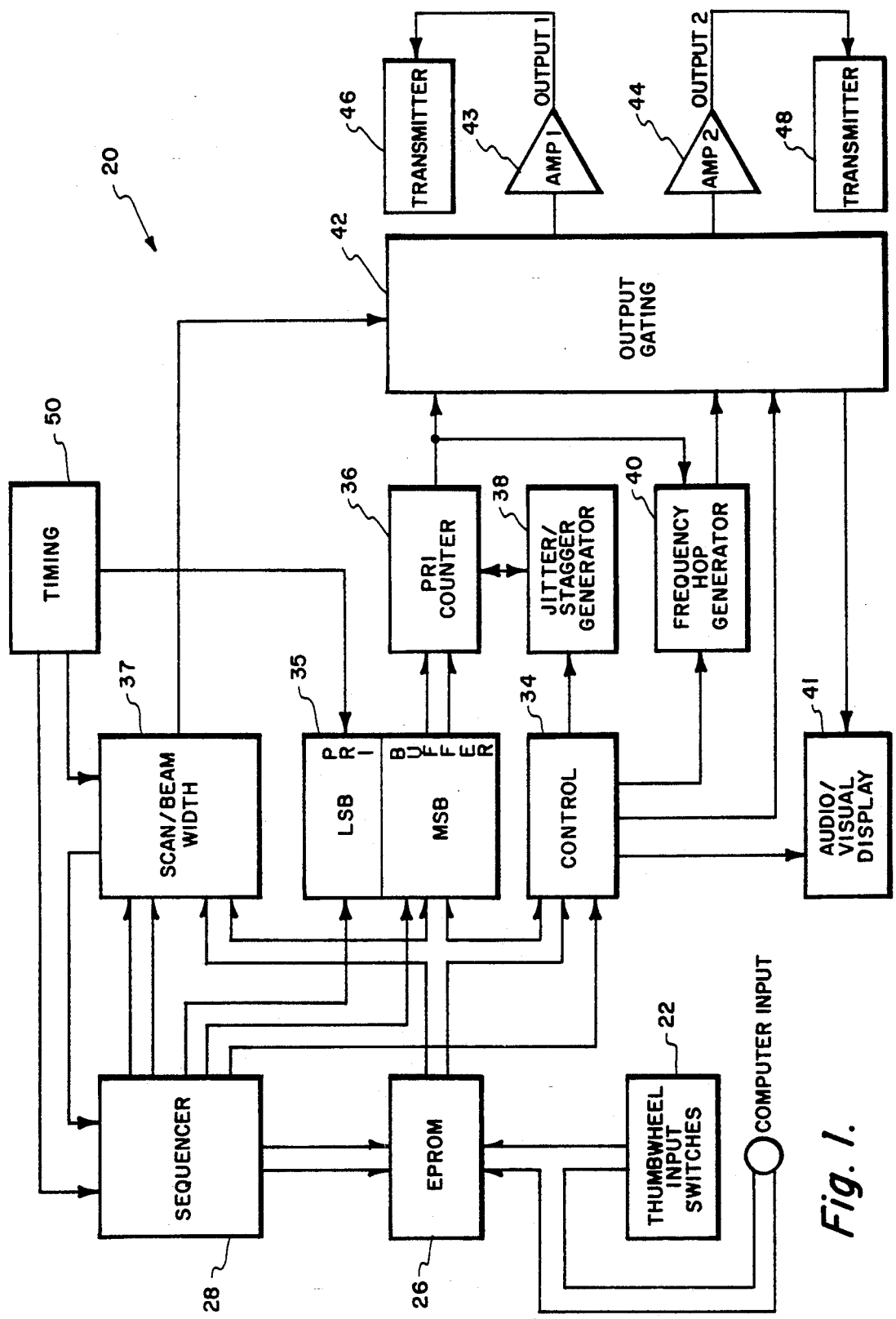
FIG. 1 is an electrical block diagram of the Portable Automatic Radar Simulator constituting the present invention.
Figure 2:
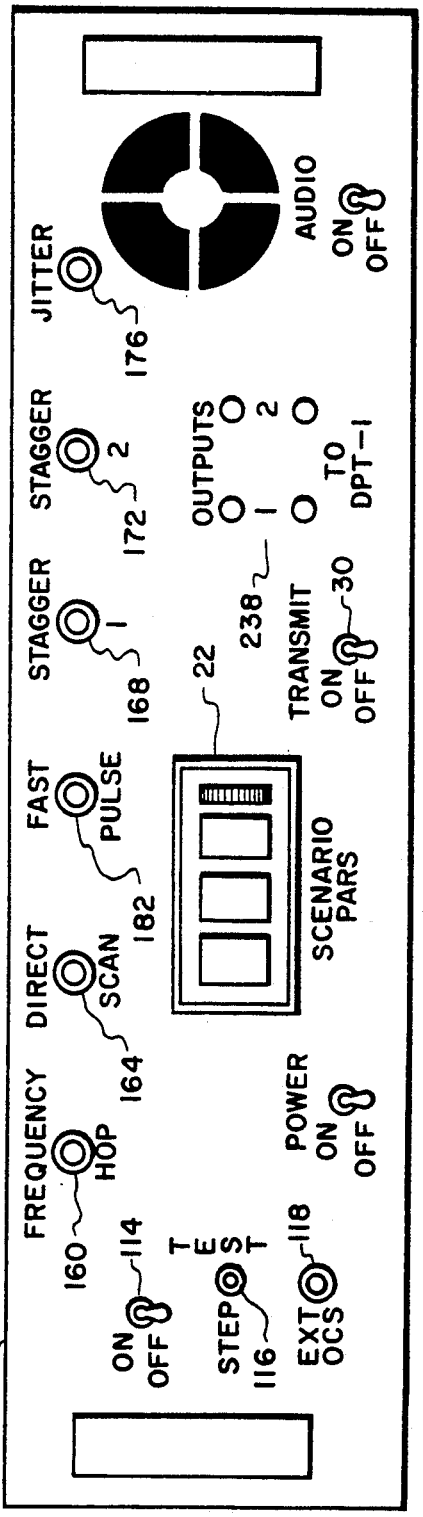
FIG. 2 illustrates the front panel of the Portable Radar Simulator of FIG. 1.

Referring to FIGS. 1 and 2, there is shown a block diagram of a portable automatic radar simulator 20 constituting the present invention. An operator selects a desired threat or radar signature to simulate and then enters the threat via thumbwheel switches 22 located on the front panel 24 of simulator 20. The thumbwheel switches 22 address the eleven most significant bits of an Erasable Programmable Read Only Memory (EPROM) 26, while a sequencer counter 28 addresses the four least significant bits of EPROM 26. Sequence counter 28 is reset to zero by a transmit switch 30 located on front panel 24 being thrown to the off position while the thumbwheel switches 22 are being set for the desired radar signature. A four line to sixteen line decoder 32, FIG. 4, of sequence counter 28 is used to gate each of sixteen eight bit words out of EPROM 26 and into the appropriate registers and counters for one thumbwheel setting.

The first eight bit word to be gated out of EPROM 26 is a control word. The eight bits of the control word are as follows:

BIT 1 (Least Significant Bit) Pulse Group Output
BIT 2 Most Significant Pulse Width Bit
BIT 3 Least Significant Pulse
BIT 4 Frequency Hop
Bit 5 Pulse Repetition Interval Stagger 128 Microseconds
BIT 6 Pulse Repetition Interval Stagger 64 Microseconds
BIT 7 Jitter
BIT 8 (Most Significant Bit) Direct Scan The second word to be gated out of EPROM 26 by a sequence counter pulse is a spare word reserved for frequency, the third word is the eight least significant bits of the Pulse Repetition Interval (PRI) and the fourth word is the eight most significant bits of the Pulse Repetition Interval. The sequence counter 28 pulses are, in turn stepped by a two microsecond clock signal.

The remaining twelve outputs provided by decoder 32 of sequence counter 28 gate six beamwidth words and six scan words from EPROM 26 into a scan and a lobe counter at a predetermined time interval.

Figure 3:
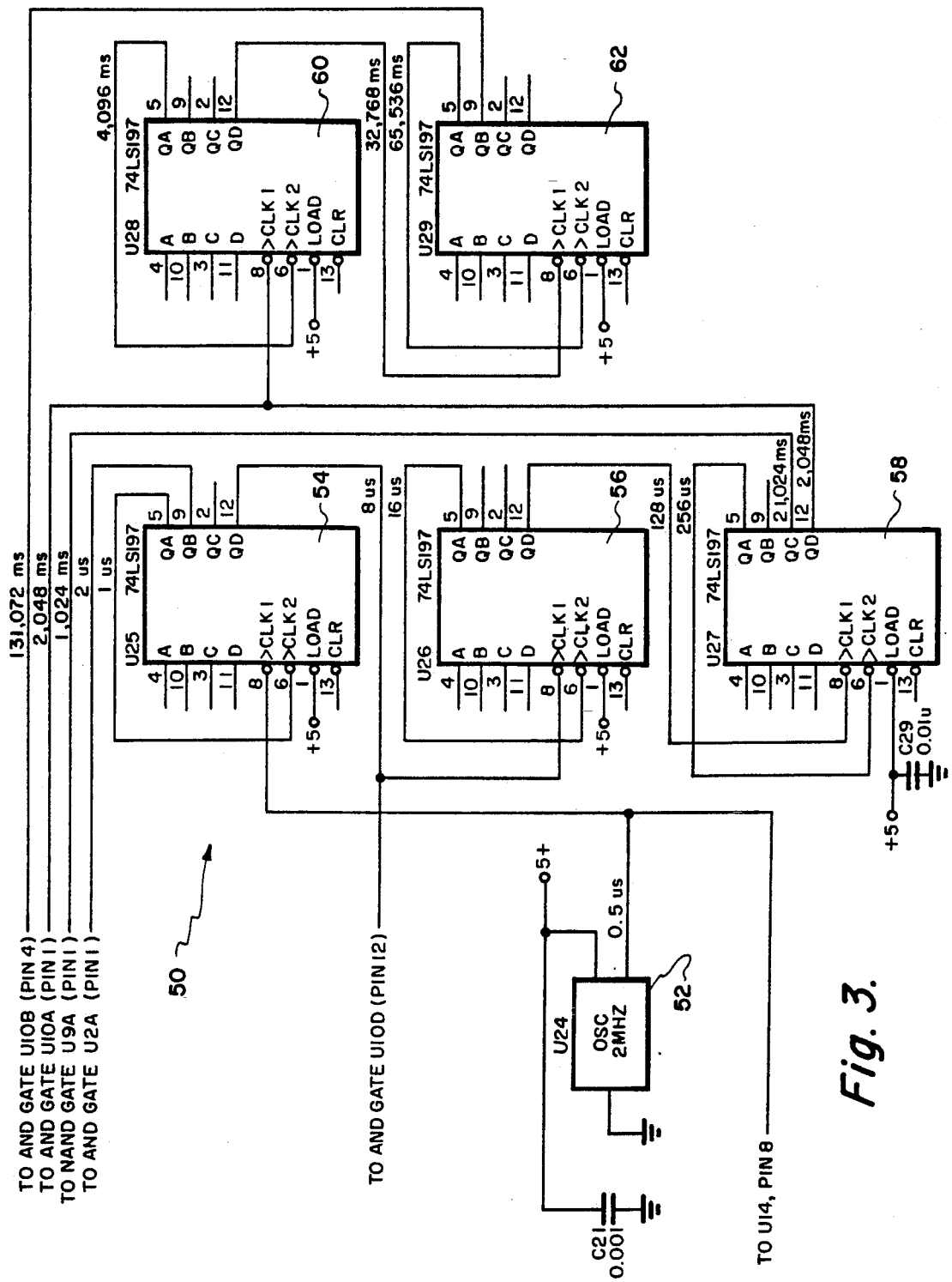
FIG. 3 is a detailed electrical circuit diagram of the timing circuit of FIG. 1.

Referring now to FIG. 3, the timing circuit 50 includes a crystal oscillator 52 which provides a master clock signal having a frequency of two megahertz and a period of 0.5 microseconds. The master clock signal provided by oscillator 52 is supplied to the CLKL input of a counter 54 which functions as a divider and provides a two microsecond clock signal at its QB output which is used to step sequencer 28, FIG. 1. Timing circuit 52 also includes counters/dividers 56, 58, 60 and 62 which continue to divide the master clock signal from crystal oscillator 52. The 1.024 millisecond clock signal provided at the QC output of counter 58 is used to generate lobe or beamwidth, the 2.048 millisecond clock signal provided at the QD output of counter 58 counts the scan period if a scan is less then 263 milliseconds, otherwise the 131.072 millisecond clock signal provided at the QB output of counter 62.

Figure 4A:
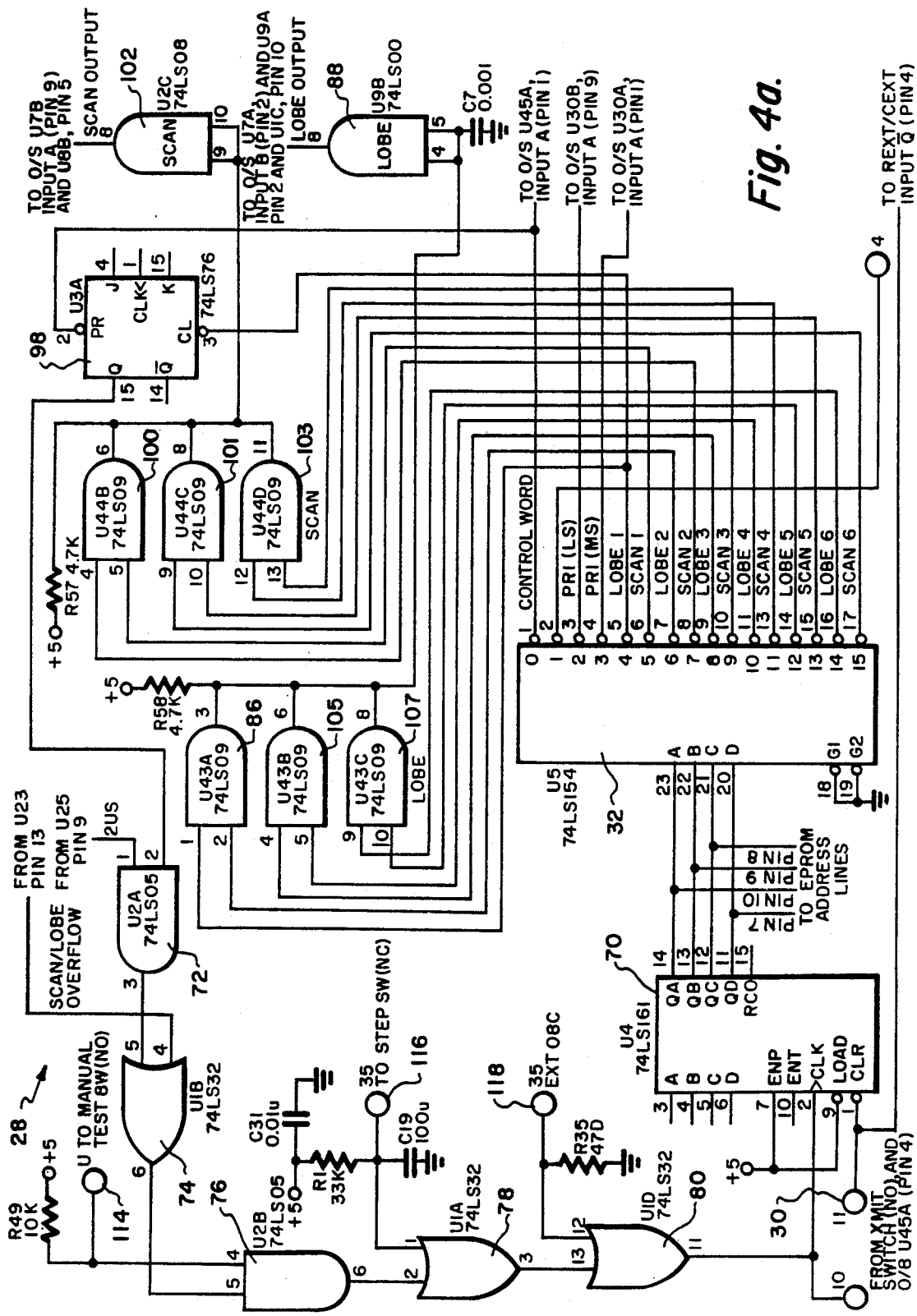
FIG. 4(A) and 4(B) is a detailed electrical circuit diagram of the sequence counter circuit of FIG. 1.
Figure 4B:
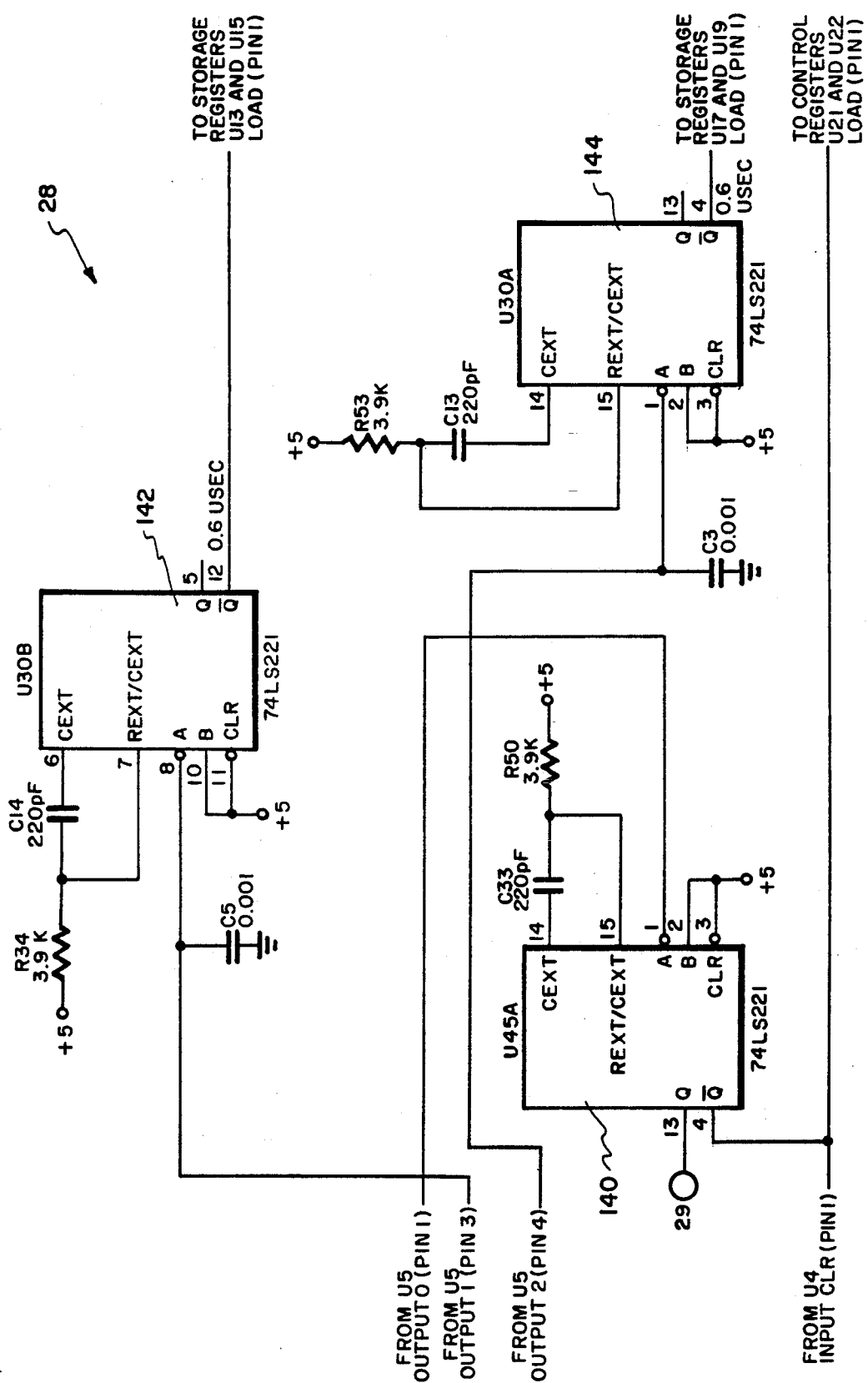

Referring to FIG. 4 there is shown sequencer 28 of portable automatic radar simulator 20. After the operator selects the threat to be simulated with the front panel thumbwheel switches 22 he then throws the transmit switch 30 to the on position removing the ground from the CLEAR input of a synchronous binary counter 70. The synchronous binary counter 70 which is now in the cleared state causes four line to sixteen line decoder 32 to have its zero output at an active low state, that is a zero state and gates the control word from EPROM 26 to a pair of buffers/line drivers 110 and 111, FIG. 7(C) and then to a pair of storage registers 82 and 84, FIG. 7(C). With the CLEAR input of synchronous binary counter 70 at a logic one state counter 70 is free to begin counting. The two microsecond clock pulse provided by counter 54, FIG. 3, is supplied to the first input of an AND gate 72 and then through OR gate 74, AND gate 76 and OR gates 78 and 80 to the CLK input of Counter 70 and is used to step counter 70. The first two microsecond clock pulse provided to the CLK input of counter 70 will cause the QA, QB, QC and QD outputs of counter to be respectively 1, 0, 0, 0 causing the one output of decoder 32 to go low. Two microseconds later counter 70 is again sequenced causing the QA, QB, QC and QD outputs of counter to be respectively 0, 1, 0, 0 which results in the two output of decoder 32 going to the active low state thereby generating the least significant PRI register load pulse. Two microseconds later counter 70 is again sequenced causing the QA, QB, QC and QD outputs of counter to be respectively 1, 1, 0, 0 which results in the three output of decoder 32 going to the active low state thereby generating the most significant PRI register load pulse. The next two microsecond clock pulse causes the four output of decoder 32 to go to the active low state resulting in the generation of the Lobe 1 pulse. The Lobe 1 pulse is gated through an AND gate 86 and a NAND gate 88 and then through NAND gate 90 and AND gate 92, FIG. 5, to the CLKI input of lobe/scan counter 94, FIG. 5. In addition, the Lobe 1 pulse is used to gate a pulse train through OR gate 96, FIG. 7(B), and reset J-K Flip-Flop 98. The Q output of Flip-Flop 98 goes to a logic zero state inhibiting AND gate 72 which prevents the two microsecond clock pulse from being provided to the CLK input of counter 70 thereby preventing counter 70 from incrementing the count provided at the QA, QB, QC and QD.

Figure 5:
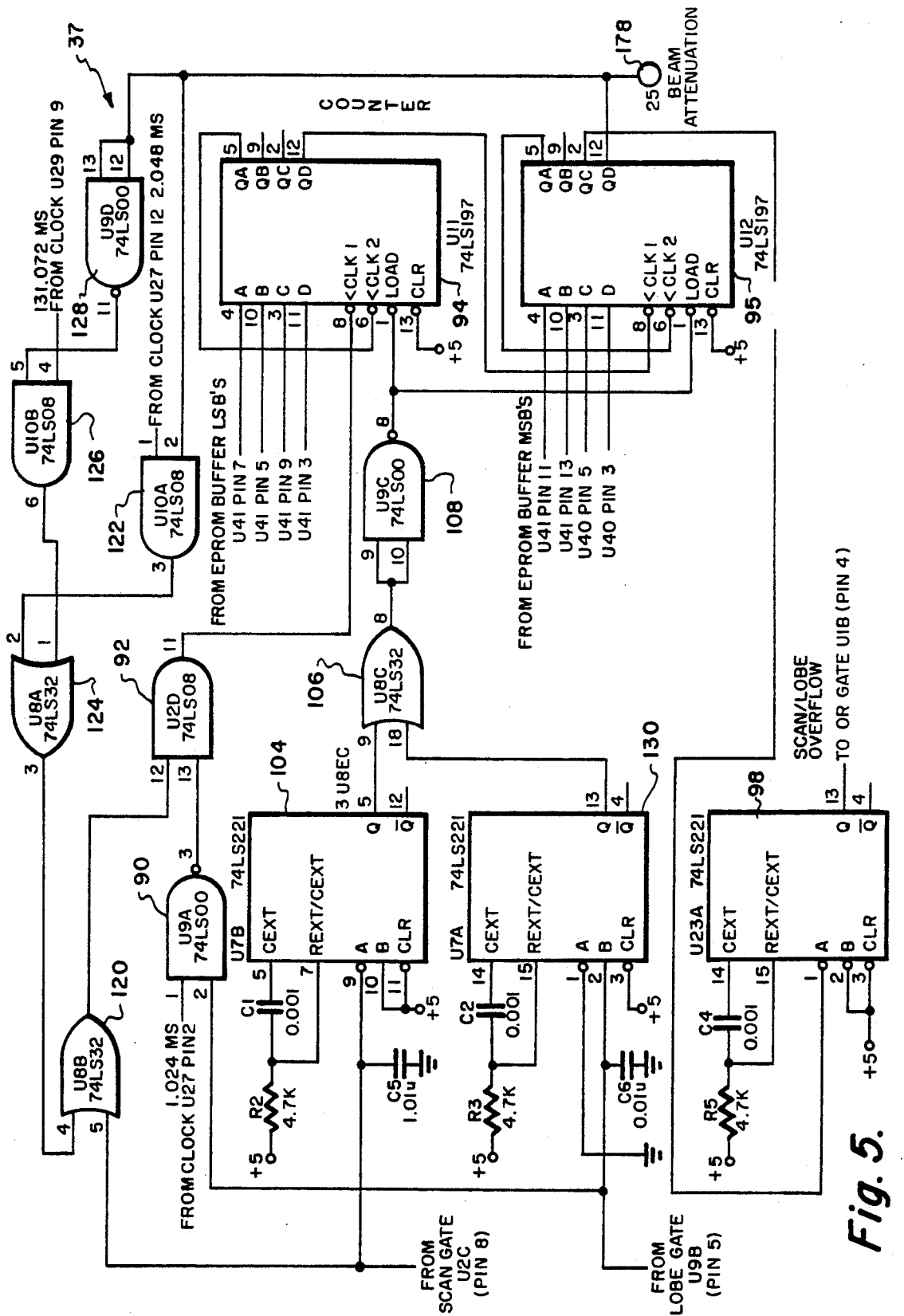
FIG. 5 is a detailed electrical circuit diagram of the scan/beamwidth generator of FIG. 1.

When counter 95, FIG. 5, overflows, a monostable multivibrator 98 generates a pulse which is then provided through OR gate 74, AND gate 76 and OR gates 78 and 80 to the CLK input of counter 70 thereby incrementing counter 70 which causes the five output of decoder 32 to go to an active zero state. The SCAN 1 pulse provided at the five output of decoder 32 is supplied through AND gates 100 and 102 to the A input of a monostable multivibrator 104 which generates a pulse at its Q output. The pulse provided by monostable multivibrator 104 is supplied through an OR gate 106 and a NAND gate 108 to the LOAD inputs of lobe/scan counters 94 and 95. This, in turn, loads the scan parameter provided by EPROM 26 through buffers 110 and 111, FIG. 7(A), into lobe/scan counters 94 and 95. In a similar manner, the overflow of counter 95 causes the decoder 32 of sequencer counter 28 to load the second lobe parameter provided by EPROM 26 through buffers 110 and 111, FIG. 7(C), into scan/lobe counters 94 and 95. This process is repeated until the overflow from SCAN 6 (fifteen output of decoder 32) causes counter 70 to return to a binary count of zero thereby reloading the control word.

The logic zero at the first output of decoder 32 is also supplied to the PR input of Flip-Flop 98 which sets the Q output of Flip-Flop 98 at the logic one state opening AND gate 72 and again allowing the two microsecond clock pulse provided by timing circuit 50 to step counter 70. This complete cycle continues to repeat until transmit switch 30 is turned to the off position and/or thumbwheels 22 are changed resulting in a different radar being simulated.

Referring to FIGS. 2 and 4 the remainder of the gating illustrated in FIG. 4 is for ease of troubleshooting. If manual test switch 114 on front panel 24 is turned to the on position, it will inhibit AND gate 76 thereby inhibiting the two microsecond clock signal and the overflow from counter 95 from incrementing counter 70. Counter 70 can now incrementall stepped by manual step switch 116 on front panel 24 or an external oscillator may be attached though the oscillator input terminal 118 on front panel 24 The external oscillator signal is then gated through NOR gate 80 which allows all outputs of decoder 32 to be checked and also to allow the use of an oscilloscope to check the operation and timing of the gates, one shots, registers and counters of the present invention.

Referring now to FIG. 5 there is shown a scan/beamwidth generator 37 which includes counters 94 and 95 for storage of the lobe and scan parameters provided by EPROM 26. When the output of NAND gate 88 goes high, the 1.024 millisecond clock signal provided by counter 58 is gated through NAND gate 90 and AND gate 92 and then to the CLKL input of scan/lobe counter 94. In addition, NAND gate 88 triggers multivibrator 130 which loads the lobe or beamwidth data from EPROM 26 into scan/lobe counters 94 and 95 through OR gate 106 and NAND gates 108.

The most significant or eighth bit of each lobe data word provided by EPROM 26 is an attenuation flag bit. If this bit is at the logic one state then this bit may be used to signal an RF device that would attenuate the particular lobe associated with the lobe data word provided by EPROM 26 and then allow for the generation of side lobes or the generation of the first and last lobes of a complex scanning radar such as a palmer or raster scanner. When counters 94 and 95 count up to their combined overflow which represents the lobe time period monostable multivibrator/one shot 98 is triggered which advances counter 70, FIG. 4, thereby enabling one of the SCAN outputs of decoder 32 which triggers monostable multivibrator/one shot 104 and also changes the first input of an OR gate 120 to a noninhibit or logic zero state. The most significant bit of the newly loaded scan word, that is output QD of counter 95 if high is used to gate through AND gate 122, OR gates 124 and 120 and AND gate 92 the 2.048 millisecond clock signal provided by counter 58. If the most significant bit is low which results in a logic one at the output of NAND gate 128, the 131.072 clock signal provided by counter 62, FIG. 3, is gated through AND gate 126, OR gates 124 and 120 and AND gates 92.

In the preferred embodiment of the present invention monostable multivibrators 98, 104 and 130 are all set for approximately three microsecond pulse widths, although these pulse widths are not critical to the operation of portable automatic radar simulator 20 and can be ±50% of this value.

Figure 6:
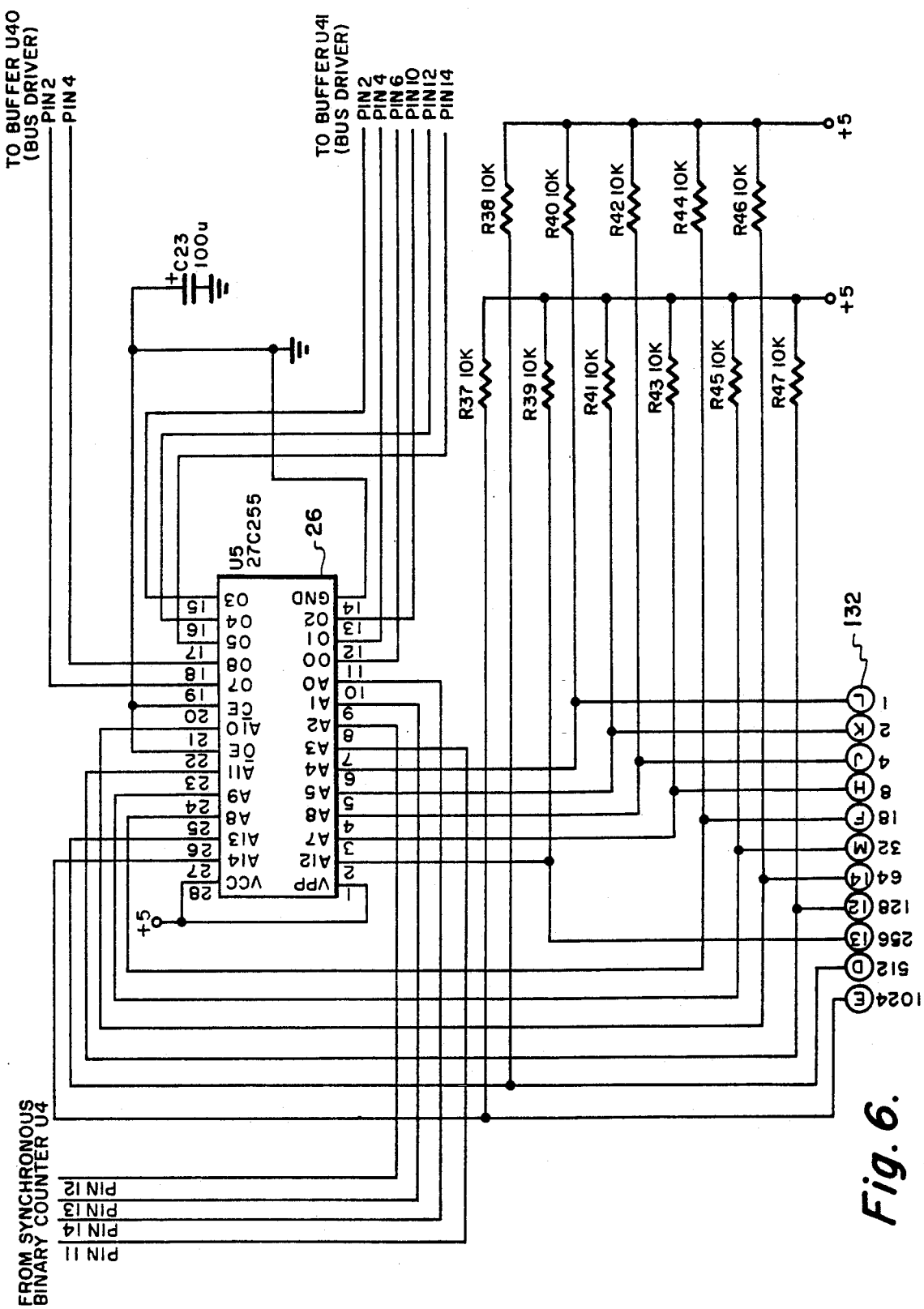
FIG. 6 is a detailed electrical circuit diagram of the EPROM of FIG. 1.

Referring to FIG. 6 there is shown EPROM 26 and associated buffer logic as well as the thumbwheel interface 132. The three thumbwheels 22 on panel 24 are coded in hexadecimal. Each thumbwheel 22 inputs represent the most significant address bits to the EPROM 26 memory. The four least significant address bits came from the QA, QB, QC and QD outputs of counter 70 of sequencer counter 28. With thumbwheels 22 set at a predetermined number, EPROM 26 is continually being addressed by the four binary bits provided by counter 7 which results in sixteen sequential eight bit words being provided by EPROM 26 for each thumbwheel setting. These eight bit words are then passed through buffers 110 and 111, FIG. 7(C) and then routed to various counters and storage registers within portable automatic radar simulator 20 where these eight bit words are loaded by signals provided from four line to sixteen line decoder 32 and its associated one shots.

Figure 7A:
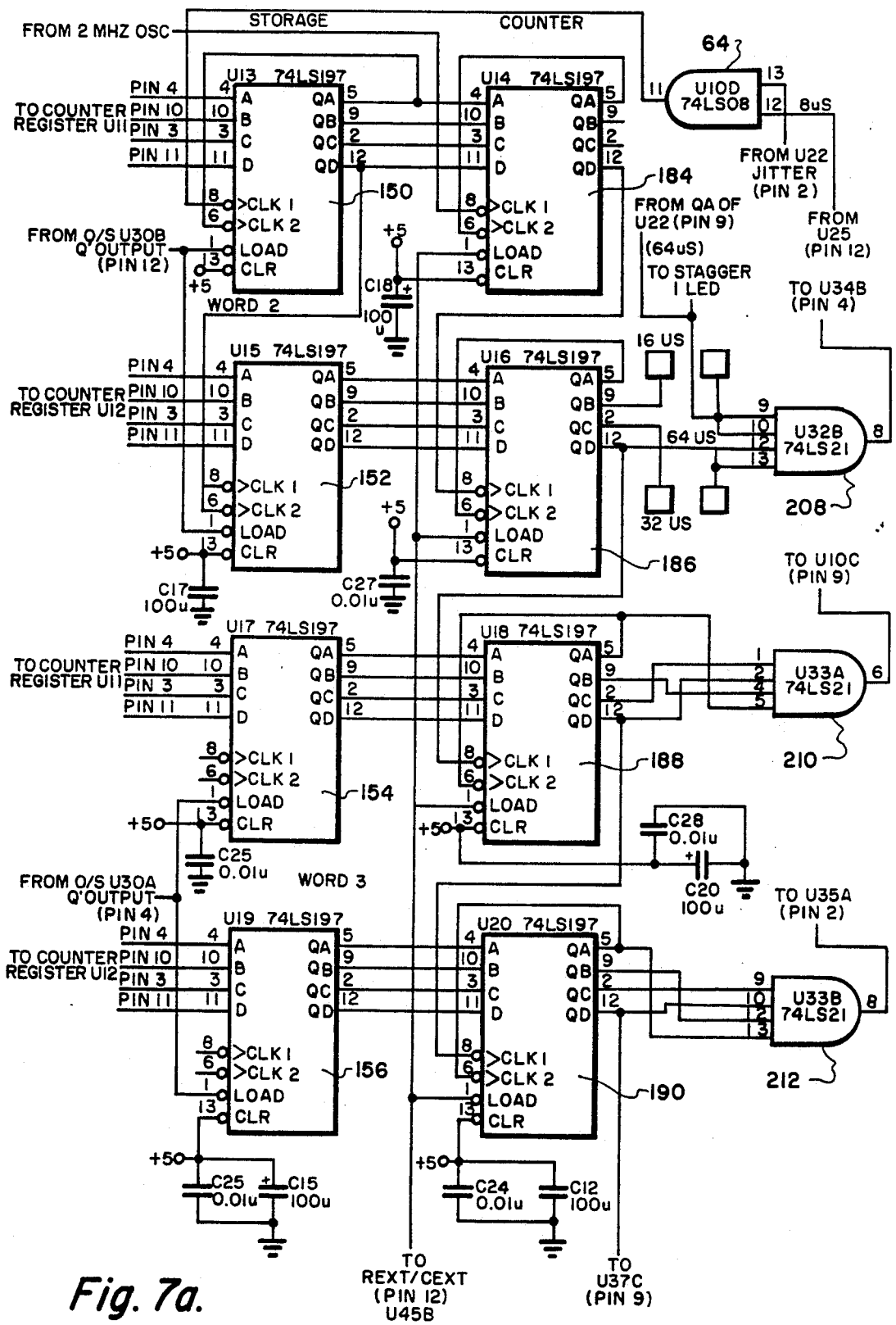
FIG. 7A, 7B and 7(C) is a detailed electrical circuit diagram of the control and display circuitry and frequency hop generator of FIG. 1.
Figure 7B:
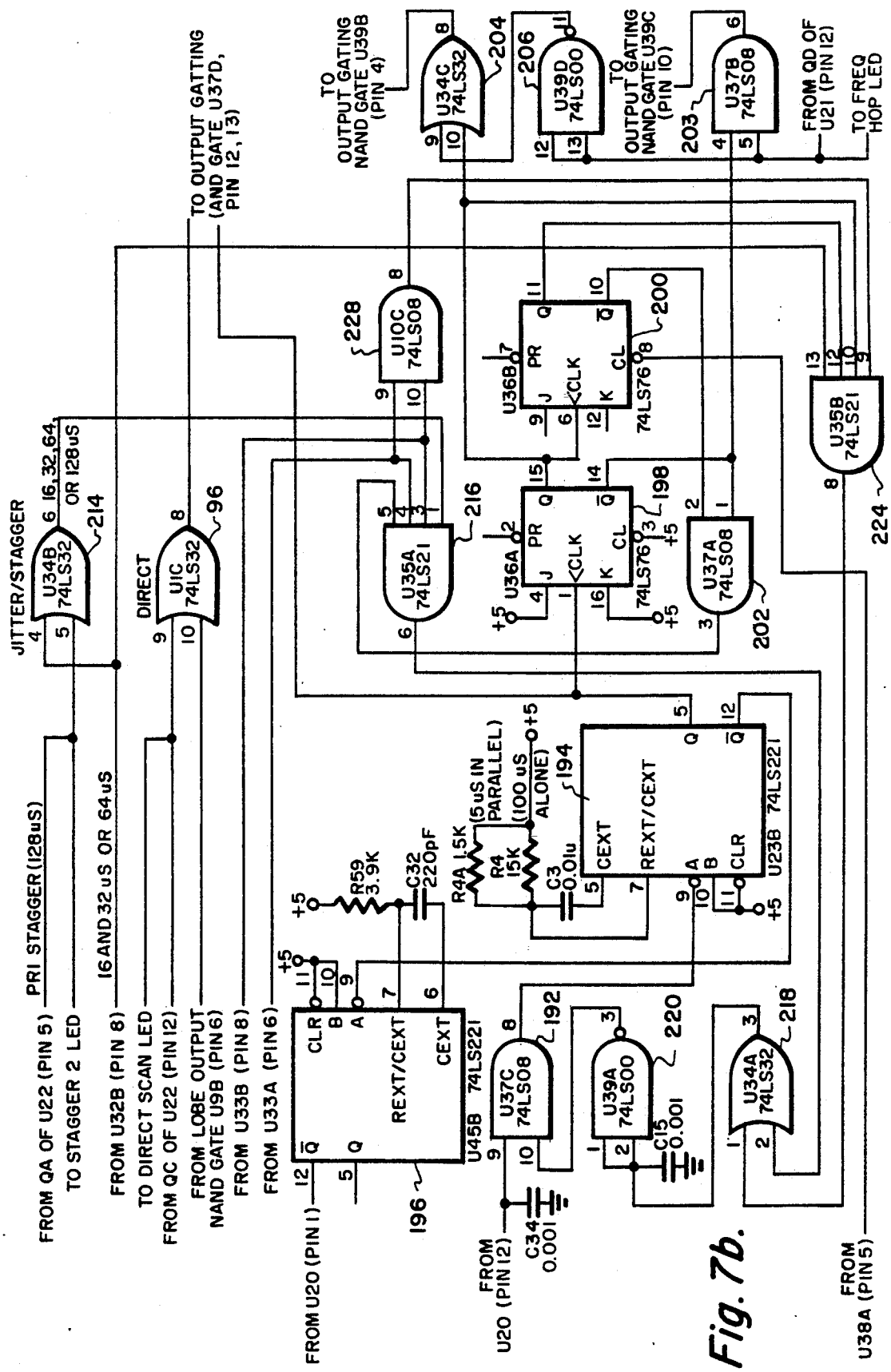
Figure 7C:
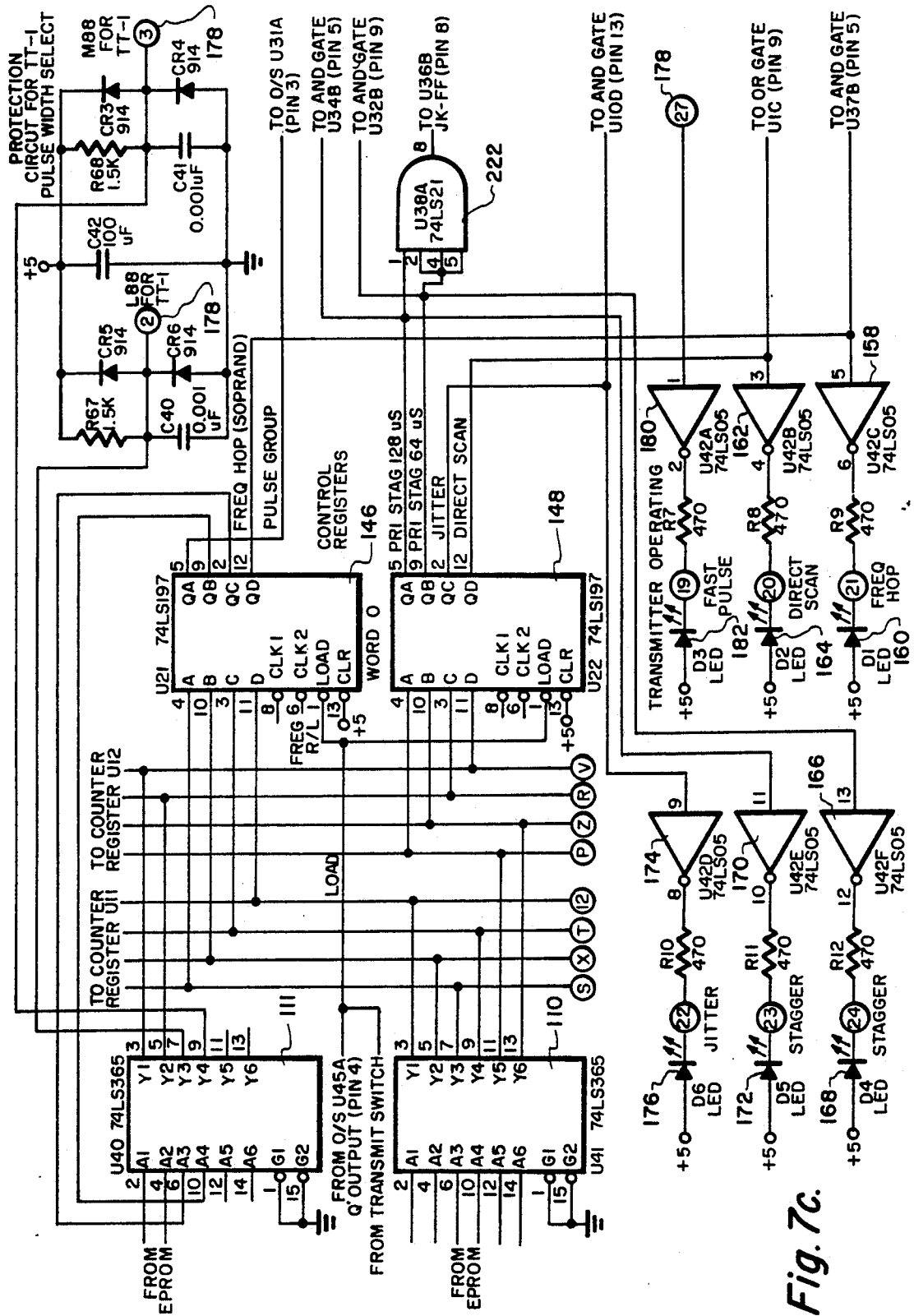

Referring to FIG. 7A, 7B AND 7(C) there is shown the detailed circuit diagrams for Control Register 34, PRI generator 36, Jitter/Stagger generator 38, Frequency Hop Generator 40 and the visual display indicators 41. Output zero of four line to sixteen line decoder 32 triggers monostable multivibrator/one shot 140, FIG. 4, which provides at the not Q output thereof a 0.6 microsecond pulse which is supplied to the load inputs of control registers 146 and 148. This 0.6 microsecond pulse loads the eight bit control word into registers 146 and 148 passed through buffers 110 and 111. The control word has the following format:

| Control Register 146 | QA output | Pulse Group Signal |
|---|---|---|
| | QB output | Most Significant Pulse Width Bit |
| | QC output | Least Significant Pulse Width Bit |
| | QD output | Frequency Hop Bit |
| Control Register 148 | QA output | PRI stagger (128 microseconds) bit |
| | QB output | PRI stagger (64 microseconds) bit |
| | QC output | Jitter Bit |
| | QD output | Direct Scan Bit |

In a similar manner, output two of four line to sixteen line decoder 32 triggers monostable multivibrator/one shot 142, FIG. 4, which provides at the not Q output thereof a 0.6 microsecond pulse which is supplied to the load inputs of control registers 150 and 152. This 0.6 microsecond pulse, loads the eight least significant PRI bits into registers 150 and 152 which passed through buffers 110 and 111. Likewise, output three of four line to sixteen line decoder 32 triggers monostable multivibrator/one shot 144, FIG. 4, which provides at the not Q output thereof a 0.6 microsecond pulse which is supplied to the load inputs of control registers 154 and 156. This 0.6 microsecond pulse loads the eight most significant PRI bits into registers 150 and 152 which passed through buffers 110 and 111. It should be noted that storage register 150, 152, 154 and 156 comprise buffer 35, FIG. 1.

The Frequency Hop, the three PRI indicators and the Direct Scan bit are all provided to Light Emitting Diode (LED) Indicators for display on front panel 24. Specifically, the Frequency Hop Signal is provided from the QD output of register 146 through inverter 158 to LED 160, the Direct Scan signal is provided from the QD output of register 148 through inverter 162 to LED 164, the 64 microsecond stagger signal is provided from the QB output of register 148 through inverter 166 to LED 168, the 128 microsecond stagger signal is provided from the QA output of register 148 through inverter 170 to LED 172 and the Jitter signal is provided from the QC output of register 148 through inverter 174 to LED 176.

The two pulse width bits from register 146 (LSB QC output of register 146 and MSB QB output of register 146) and the most significant bit from Lobe counter 95 which represents a beam attenuation signal are provided to rear terminal 178. These are the MSB FOR TT-1 and LSB FOR TT-1 outputs of terminal 178 which are connected to transmitters 46 and 48. Further, a bit is provided from a rear terminal strip 178 through an inverter 180 to the fast pulse indicator LED 182 that shows if the microwave threat transmitters are pulsing.

Referring to FIGS. 1, 4 and 7, PRI generator 36 and Jitter/Stagger generator 38 operate in the following manner. When output two of four line to sixteen line decoder 32 goes to an active low state monostable multivibrator/one shot 140 is triggered and provides at the not Q output thereof a 0.6 microsecond pulse which loads the eight least significant PRI bits into storage registers 150 and 152. In a similar manner, the two microsecond pulse provided by output three of four line to sixteen line decoder 32 triggers one shot 144 which loads the most significant bits into storage registers 154 and 156. Simultaneously, the two megahertz clock signal from oscillator 52 is supplied to the CLKL input of PRI counter 184. This two megahertz clock signal, in turn, increments PRI counters 184, 186, 188 and 190 at a two megahertz rate. When an overflow occurs, that is the QD output of counter 190 which is the most significant bit of the PRI counter goes from a logic one to a logic zero, the logic one to zero transition passes through and gate 192 triggering monostable multivibrator/one shot 194. One shot 194 provides its Q output an adjustable length pulse which is required to trigger a magnetron microwave transmitter. In the preferred embodiment, one shot 194 provides a 120 microsecond pulse for a AN/DPT-1 magnetron and a 20 microsecond pulse for TT-1 magnetron, although it should be understood that one shot 194 may be adjusted to provide pulses having different lengths. These pulses are gated through output gating circuit 42, FIG. 1, to output driver amplifiers 43 and 44, FIG. 1. In addition, one shot 194 triggers a 0.6 microsecond monostable multivibrator/one shot 196. One shot 196 which has its not Q output connected to the LOAD inputs of counters 184, 186, 188 and 190 provides a pulse which reloads the PRI number from registers 150, 152, 154 and 156 into these counters.

The overflow from one shot 194 also triggers JK Flip-Flops 198 and 200 since the Q output is connected to the CLK input of Flip-Flop 198 and the Q output of Flip-Flop 198 is connected to the CLK input of Flip-Flop 200. When the Frequency Hop Bit is true, that is the QD output of control register 146 is in the logic one state, then as Flip-Flop 198 is toggled by each PRI pulse provided at the Q output of one shot 194 either AND gate 203 or And gate 204 will be active on every other pulse. When the output of NAND gate 206 (Frequency Hop Bit is true) is at the logic zero state a logic zero to one and logic one to zero transition at the Q output of Flip-Flop 198 will now pass through OR gate 204. Similarly, the first input to AND gate 203 is now at a logic one state allowing a logic zero to one and logic one to zero transition at the not Q output of Flip-Flop 198 to pass through AND gate 203. These gates are used to enable either of the two driver amplifiers 43 and 44.

The Jitter/Stagger circuitry operates in the following manner. When the 64 microsecond PRI stagger is set, that is the QB output of register 148 is at the logic one state, then AND gate 208 is enabled. This AND gate 208, along with AND gates 210 and 212 function as an AND gate which is wired to recognized when the PRI counters 184, 186, 188 and 190 have a count of 128 to go before overflow. Since the PRI clock is counting at a 2 megahertz, this represents 64 microseconds. Likewise, if the 128 microsecond PRI stagger bit is set, that is the QA of register 148 is set at a logic one state, then OR gate 214 and in conjunction with AND gates 210 and 212 recognizes a count of 256 to go before overflow or time period of 128 microseconds.

In the stagger mode of operation for portable automatic radar simulator 20 the shortened PRI time period occurs only every other time period. To accomplish this Flip-Flop 198 is used. The Flip-Flop 198 is toggled on every PRI counter overflow pulse, that is a logic one to zero transition at the QD output of counter 190. This results in gate 202 being enabled on every other pulse provided by one shot 194 which, in turn, enables AND gate 216, OR gate 218 and AND gate 220 triggering one shots 194 and 196 which reload PRI counters 184, 186, 188 and 190. The next PRI overflow pulse toggles Flip-Flop 200 which inhibits AND gate 202 so that PRI counters 184, 186, 188 and 190 count to their overflow value before one shots 194 and 196 are triggered which, in turn reloads the PRI counters. This cycle continuously repeats and is similar for both the 64 microsecond stagger modes of operation.

The three level PRI stagger mode of operation occurs when the QA and QD outputs of register 148 are at the logic one state. AND gate 222 is now at the logic one state removing the logic zero from the CL input of Flip-Flop 200 which now makes Flip-Flops 198 and 200 a two stage binary counter. In the first instance when the Q outputs of Flip-Flops 198 and 200 are zero, AND gate 202 is enabled which, in turn, allows AND gate 216 to detect a 128 microsecond interval since this interval would occur first.

When Flip-Flop 198 is toggled true, that is the Q output of Flip-Flop 198 is at the logic one state and the Q output of Flip-Flop 200 is at the logic zero state, or when the Q output of Flip-Flop 198 is at the logic zero state and the Q output of Flip-Flop 200 is at the logic one state then AND gate 202 and AND gate 224 are both disabled resulting in a normal PRI. When the Q output of Flip-Flop 198 and the Q output of Flip-Flop 200 are at the logic one state, AND gate 202 is disabled, while AND gate 224 is enabled since the Q outputs of Flip-Flops 198 and 200 are supplied to AND gate 224. When the QD output of Counter 186 is at the logic one state (at 64 microseconds) and the output of AND gate 228 is at the logic one state, one shot 194 is triggered which results in a shortened PRI of 64 microseconds. The output of AND gate 228 is, in turn, at the logic one state only when the QA, QB, QC and QD outputs of PRI counters 188 and 190 are at the logic one state resulting in logic ones at 10 the outputs of AND gates 210 and 212. This four step stagger pattern of a 128 microsecond shortened PRI/normal PRI/normal PRI/64 microsecond shortened PRI then repeats itself until thumbwheels 22 are changed.

Referring to FIGS. 3 and 7 when the QC output of control register 148 is at the logic one state (indicating Jitter) AND gate 64 is enabled which gates the eight microsecond clock pulse provided by counter 54 to the CLK input of control register 150. Control Registers 150 and 152 are, in turn, connected to function as a counter in addition to being connected as storage registers for PRI counters 184 and 186. When registers 150 and 151 load the stored PRI into counters 184 and 186 after overflow these registers are loading a new PRI that has had the eight least significant bits pseudo randomly modified by the eight microsecond clock signal from counter 54.

Figure 8:
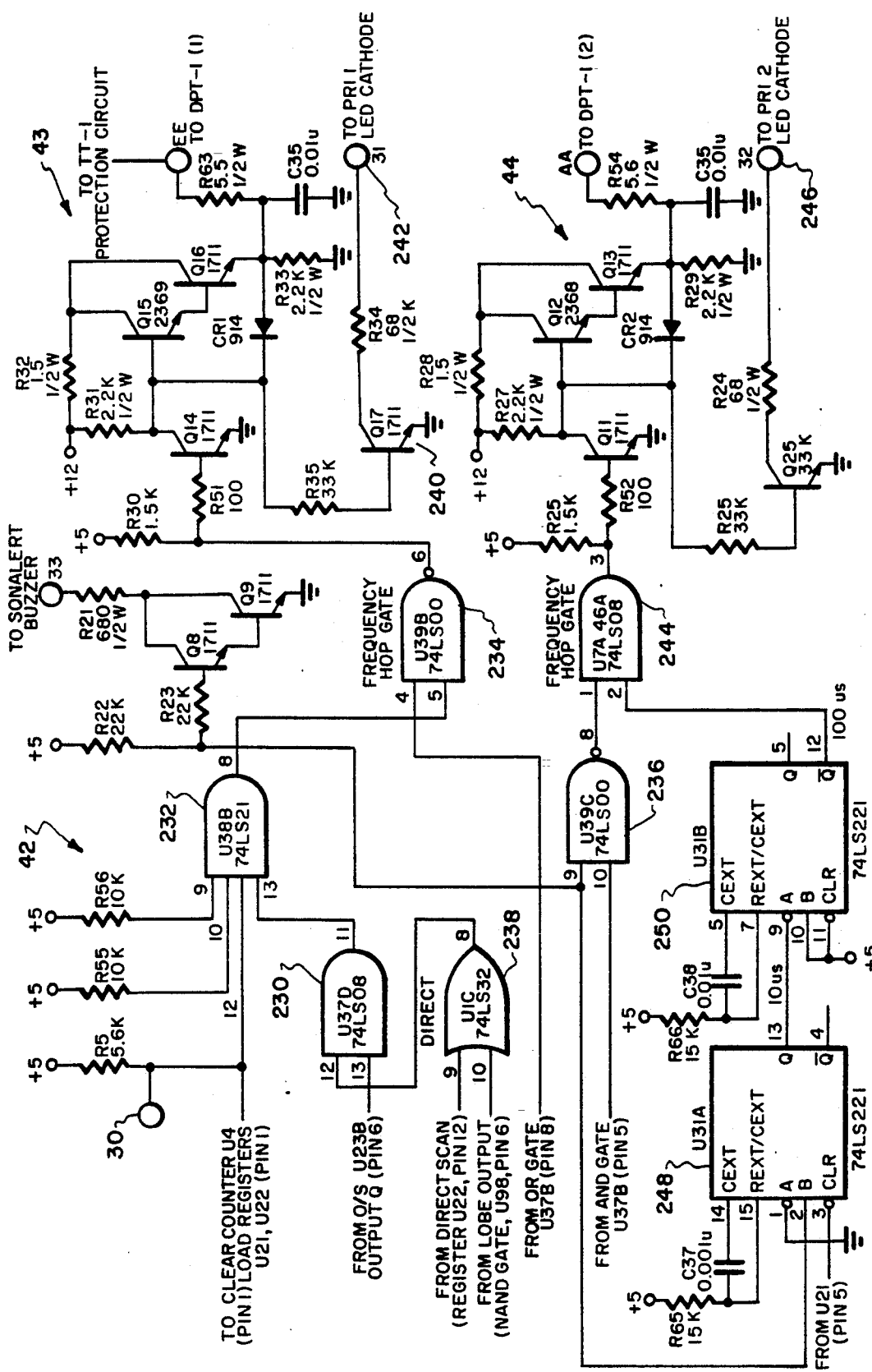
FIG. 8 is a detailed electrical circuit diagram of the output amplifiers and gating circuit of FIG. 1.

Referring to FIG. 8, there is shown the output amplifiers and gating circuit of portable automatic radar simulator 20. Whenever a simulated radar pulse is to be generated as determined by the PRI counter, one shot 194 is triggered. This one shot 194 is set to over 100 microseconds when used to trigger an AN/DPT-1 transmitter or may be set to approximately twenty microseconds when used with a TT-1 transmitter. This PRI pulse provided by one shot 194 is ANDED by AND gate 230 with the lobe active signal provided by NAND gate 88 or the direct control bit signal provided by register 148 through OR gate 232. When the transmit switch 30 is low, the output of AND gate 238 is 15 a logic zero, counter 70 is in the cleared state and registers 146 and 148 will be loading the control word from EPROM 26. When the transmit switch 30 is in the on or open position plus five volts is provided to input twelve of AND gate 232 allowing AND gate 232 to gate the PRI pulse there through to NAND gates 234 and 236 and to output amplifiers 43 and 44.

In most cases the, the programmed threat to be simulated by portable automatic radar simulator 20 will not be a frequency hoping radar so that NAND gate 234 will be enabled and signals will pass through NAND gate 234 to driver 43 which is configured as an emitter follower driven by twelve volts direct current and then provided to a BNC connector 238 on the front panel 24 for driving a DPT-1, TT-1 transmitter or other type transmitter used with the present invention. In addition, a separate amplifier 240 drives a visual output LED 242.

If the radar to be simulated is a frequency hoping radar or it is required to double the duty cycle of the microwave transmitter, then NAND gates 234 and 236 are activated on every other PRI pulse since NAND gate 234 is connected to the Q output of Flip-Flop 198 through OR gate 202 and NAND gate 236 is connected to the not Q output of Flip-Flop 198 through and gate 203. AND gate 244 drives emitter follower amplifier 44 which is brought to connector 238 and LED output 246.

Output gating circuit 42 also includes a pair of monostable multivibrators/one shots 248 and 250. When the Pulse Group signal at the QA output of Register 146 is high a PRI pulse provided from AND gate 232 to the B input of one shot 248 will trigger one shot 248 providing at its Q output a ten microsecond pulse the trailing edge of which triggers one shot 250 which provides a one hundred microsecond pulse to input two of AND gate 244 which functions as an OR gate and activates amplifier 44 after a !0 microsecond delay provided by one shot 248.

When programming EPROM 26 if the P selection is chosen under Frequency Hop, a pulse group signal will result. A second pulse is generated at the output of AND gate 244 at the same frequency as the pulse at NAND gate 242 but delayed by ten microseconds with one shots 248 and 250. This allows portable automatic radar simulator 20 to simulate a radar having an output consisting of a string of two quick pulses followed by a normal pulse repetition interval or PRI. Since magnetrons cannot recover fast enough or have a high enough duty cycle to simulate this kind of radar two magnetron transmitters are utilized.

Figure 9:
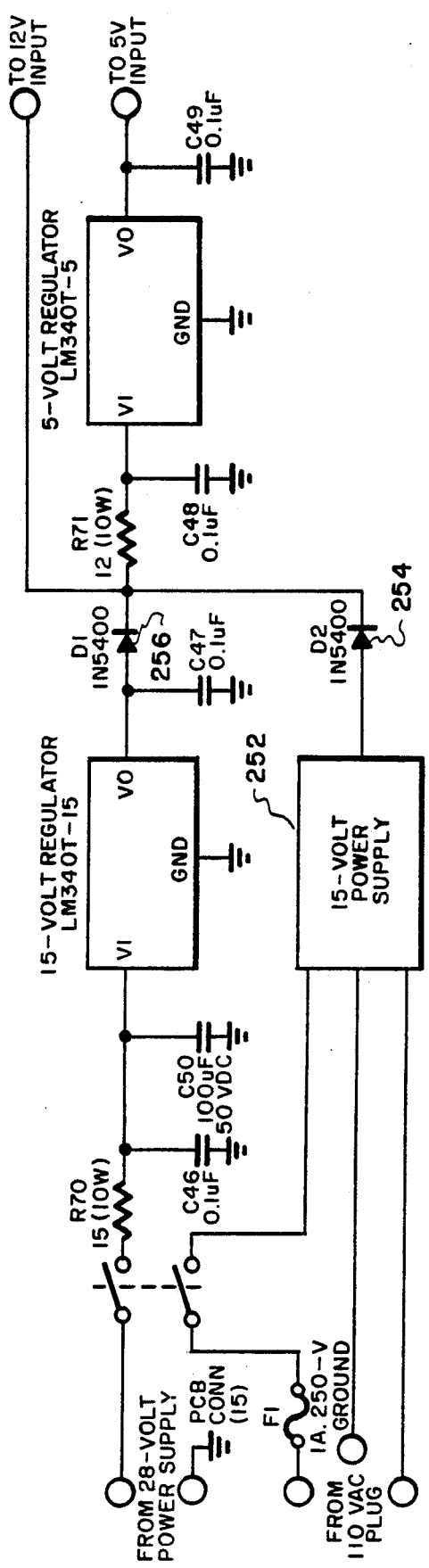
FIG. 9 is a detailed electrical circuit diagram of the power supply for the Portable Automatic Radar Simulator constituting the present invention.

Referring to FIG. 9, the power for portable automatic radar simulator 20 is supplied by connecting simulator 20 into 115 volts alternating current sixty hertz or aircraft or shipboard twenty eight volt direct current power. Both power sources are converted to fifteen volts direct current by a fifteen volt power supply 252 and ORed together through diodes 254 and 256 to supply both twelve volts direct current and five direct current to the simulator 20 circuitry.

EPROM OPERATION

A brief description of how a user would code radar threat parameters into a form that could be encoded into EPROM 26 for use in the portable automatic radar simulator 20 is set forth below. The program which is written in D Base runs on a DOS computer. In the "ADD" option, the user is presented with an easy to use form that prompts the user for the following information for each simulated radar or threat:

1. Threat No.
2. Jitter or Stagger 0-4    0 = No jitter/stagger
    1 = 64 usec stagger
    2 = 128 usec stagger
    .3 = Combination of the above 4 = Pseudo random jitter
3. Scan, A = Circular
    B = Bi-directional
    D = Steady or direct
    F = Conical, circular palmer or raster
4. Freq Hop or Duty Cycle Doubling - Y/N
    Pulse Group Simulation - P
5. Pulse Width  (2)  (4)  (8)  (1)
    .2 usec  .4 usec  .8 usec  1.2 usec
6. PRF (Pulse Repetition Frequency) or PRI (Pulse Repetition Interval)
7. Beamwidth - Decision whether Beamwidth will be entered in degrees or milliseconds
8. Sector width
9. Beamwidth, scan period and attenuation for 6 cycles
A sample of 15 threats is given in the attached file BPI.

After the data in FIG. 10 is verified, a commercial computer can convert it into hexadecimal code as shown in FIG. 11. Using standard off the shelf EPROM coding hardware which is well known to those skilled in the art, this hexadecimal information is burned into the EPROM 26 for use by the portable automatic radar simulator 20.

An example of utilizing this hexadecimal information is as follows:

Assume the operator dials in threat number 000 on the front panel thumbwheels 22. This programs the 11 most significant bits on EPROM'S 26 address, which in this case, are all 0's. The operator then throws the transmit switch 30. This removes the inhibit on the last four bit address counter 70. Initially, it is all zeros which gates out the control word, which is hex 84, shown in FIG. 11. The control word is locked into the 8 bit control register 146 and 148 by one shot 140 as follows:

|  | Most Sig. Bits | | | | Least Sig. Bits | | |
|---|---|---|---|---|---|---|---|
|  | 8 Direct | 4 Jit | 2 Stag 64 | 1 Stag 128 | 8 Freq Hop Pulse | 4 LS Pulse Width | 2 MS Group Width | 1 Pulse |
| Hex 84 = | 1 | 0 | 0 | 0 | 0 | 1 | 0 | 0 |

This means it is direct or steady radar simulate a pulse width of 0.4 usec (00=0.2, 10=0.4, 01=0.8, 11=1.2 usec)

The address counter 70 then steps to count 1 which is the spare unused EPROM address. Address counter 70 then steps to count 2 (third EPROM address 00000000000/0010) which is the least significant PRI bits (hex 34) which are loaded at by one shot !42. Count 3 is the most significant PRI bits, (hex F8) which are loaded by one shot 142.

|  | Ms | 1024 | 512 | 256 | 128 | 64 | 32 | 16 | LS |
|---|---|---|---|---|---|---|---|---|---|
| PRI | 8 4 2 1 | 8 | 4 | 2 | 1 | 8 | 4 | 2 1 | 8 4 2 1 |
| Hex F8 34 | 1 1 1 1 | 1 | 0 | 0 | 0 | 0 | 0 | 1 1 | 0 1 0 0 |

This adds up to a count of 1996 which is overflow. Since the clock (counter 54, QB output) is counting at a 0.5 microsecond rate, this corresponds to a PRI of 998 microseconds. When you add the 2 microsecond reloading time it comes to the 1000 microsecond PRI originally entered for threat number 000. Since this threat is a direct or a steady simulation no Beamwidths or Scans need to be entered.

One more example, threat number 00B, will be analyzed. The thumbwheels 22 will be set at 00B giving the following address at the time of throwing the transmit switch 30:

| MSB | | LSB |
|---|---|---|
| 0000 0000 1011 | | 0000 |

The control word is hex 04

| MSB | | | | LSB | | | |
|---|---|---|---|---|---|---|---|
| Direct | Jit | Stag 64 | Stag 128 | Freq Hop | LS PW | MS OW | Pulse Group |
| Hex 04 = 0 | 0 | 0 | 0 | 0 | 1 | 0 | 0 | meaning scan (not direct), no jitter, stagger, frequency hop or pulse groups and a pulse width of 0.4 microseconds. The time period 2 is a spare time, 3 and 4 are 34 F8 for the same 1000 microsecond PRF as in threat 000. During time period five, the Scan/Beamwidth counter 37 is loaded with hex 4F or:

| 128 | 64 | 32 | 16 | 8 | 4 | 2 | 1 |
|---|---|---|---|---|---|---|---|
| 0 | 1 | 0 | 0 | 1 | 1 | 1 | 1 |

Since the MSB (128) is reserved to indicate the necessity to attenuate the output signal, it is ignored. To ripple over requires a count of 32+16+1 or 49. Since the clock is counting at a 1.024 millisecond rate, this would equal the 50 usec beamwidth as loaded by the operator.

At time period six (address count 5 since the counter 70 started at zero), the first scan is loaded into the same Scan/Beamwidth counter 37. This number hex E7 looks as follows:

| 128 | 64 | 32 | 16 | 8 | 4 | 2 | 1 |
|---|---|---|---|---|---|---|---|
| 1 | 1 | 1 | 0 | 0 | 1 | 1 | 1 |

Since the MSB is set to 1, the 2.048 millisecond clock signal is selected giving an overflow count of 25 or 50 millisecond scan time or output off time. The off time, when added to the Band Width on time of 50 milliseconds, gives the operator entered 100 milliseconds scan time. The Scan/Beamwidth time cycle repeats until simulator gets to scan time six. Since this is a raster simulation, a longer off time now is required to simulate the raster radar resetting to it's starting point. The hex number for this scan off time is 78 shown as follows:

| 128 | 64 | 32 | 16 | 8 | 4 | 2 | 1 |
|---|---|---|---|---|---|---|---|
| 0 | 1 | 1 | 1 | 1 | 0 | 0 | 0 |

Since the MSB is zero, the 131.072 microsecond clock is selected (8×131.1=1048 milliseconds) resulting in approximately the entered last off time of 1000 milliseconds.

From the foregoing, it may be seen that the present invention comprises a new, unique, and exceedingly useful automatic radar simulator which constitutes a considerable improvement over the known prior art. Obviously many modifications and variations of the present invention are possible in light of the above teachings. It is therefore to be understood that within the scope of the appended claims that the invention may be practiced otherwise than as specifically described.

What is claimed is:

1. A digital radar simulation system for simulating up to 2048 pre-programmed radar signatures, said digital radar simulation system comprising:

thumbwheel switching means for providing a plurality of digital logic signals, said digital logic signals being representative of 2048 pre-programmed radar signatures said digital radar simulation system simulates, said thumbwheel switching means upon being set to one of the 2048 radar signatures to be simulated providing the most significant bits of the digital address indicative of said radar signature;

sequencing means for providing the least significant bits of said digital address indicative of said radar signature being simulated;

memory means for storing said 2048 radar signatures therein, said memory means in response to the address supplied by said thumbwheel switching means and said sequencing means providing an eight bit control word, a pair of pulse repetition interval data words, a plurality of lobe data words and a plurality of scan data words for the radar signature being simulated;

control register means for receiving said eight bit control word and storing said control therein while said radar signature is being simulated:

the first and second bits of said control word representing a pulse width for the radar signature being simulated;

pulse repetition interval generating means for receiving a pair of eight bit data words from said memory means, said first eight bit data word being the least significant bits of said pulse repetition interval and said second eight bit data word being the most significant bits of said pulse repetition interval;

said pulse repetition interval generating means, responsive to said first and second data words generating a pulse repetition interval for the radar signature being simulated;

jitter generating means for receiving the third, fourth and fifth bits of said control word and in response to the third, fourth and fifth bits of said control word providing either a sixty four microsecond shortened time period for ever other pulse repetition interval generated by said pulse repetition generating means or a one hundred twenty eight microsecond shortened time period for every other pulse repetition interval generated by said pulse repetition generating means;

beamwidth and scan generating means for generating a beamwidth and side lobes for the radar signature being simulated in response to the lobe data words supplied thereto by said memory means, said lobe data words being indicative of the beamwidth and side lobes of the radar signature being simulated;

said beamwidth and scan generating means generating a scan and scan period for the radar signature being simulated in response to the scan data words supplied thereto by said memory means;

frequency hop generating means for generating a frequency hop within the radar signature being simulated by said digital radar simulation system, said frequency hop being generated by said frequency hop generating means in response to the sixth bit of said control word; and output circuit means for receiving the seventh and eight bits of said control word, for providing in response to the seventh bit of said control word a direct scan radar signature and for providing in response to the eight bit of said control word a pulse group within the radar signature being simulated and for gating the pulse repetition interval, the frequency hop, the beamwidth, side lobes, scan and scan period into the radar signature being simulated by said digital radar simulation system.

2. The system of claim 1 wherein said memory means comprises an Erasable Programmable Read Only Memory.

3. The system of claim 1 further characterized by clock generating means for providing a 0.5 microsecond clock signal, a two microsecond clock pulse, an eight microsecond signal, a 1.024 millisecond clock signal, a 2.048 millisecond clock signal and a 131.072 millisecond signal, said 0.5 microsecond clock signal being provided to said pulse repetition interval generating means, said two microsecond clock signal being supplied to said sequencing means, said eight microsecond clock signal being supplied to said jitter generating means and said 1.024, 2.048 and 131.072 millisecond clock pulses being supplied to said beamwidth and scan generating means.

4. The system of claim 3 wherein said clock generating comprises:
oscillating means for generating a 0.5 microsecond clock signal;
first counter means for receiving said 0.5 microsecond clock pulse and for dividing said 0.5 microsecond clock signal and thereby provide said two and eight microsecond clock signals;
second counter means for receiving said eight microsecond clock signal and for dividing said eight microsecond clock signal and thereby provide said 1.024 and said 2.048 millisecond clock signals; and
third counter means for receiving said 2.048 millisecond clock signal and for dividing said 2.048 millisecond clock signal and thereby provide said 131.072 millisecond clock signal.

5. The system of claim 1 wherein the scan generated by said beamwidth and scan generating means may comprises a circular scan, a bi-directional scan, a conical scan, a circular palmer scan or a raster scan.

6. The system of claim 1 wherein said sequencing means comprises:
means for generating a two microsecond clock signal
a first AND gate having a first input for receiving said two microsecond clock signal, a second input and an output;
an OR gate having a first input connected to the output of said first AND gate, a second input electrically coupled to said beamwidth and scan generating means and an output;
a synchronous binary counter having a clock input connected to the output of said OR gate, a clear input and first, second, third and fourth outputs;
a four line to sixteen line decoder having first, second, third and fourth inputs respectively connected to the first, second, third and fourth outputs of said synchronous binary counter and sixteen outputs;
a first monostable multivibrator having an input connected to the first output of said four line to sixteen line decoder, and an output connected to the clear input of said synchronous binary counter;
a second monostable multivibrator having an input connected to the third output of said four line to sixteen line decoder, and an output electrically coupled to said pulse repetition interval means;
a third monostable multivibrator having an input connected to the fourth output of said four line to sixteen line decoder, and an output electrically coupled to said pulse repetition interval means;
a second AND gate having first, second, third, fourth, fifth and sixth inputs respectively connected to the fifth, seventh, ninth, eleventh, thirteenth and fifteenth outputs of said four line to sixteen line decoder and an output;
a third AND gate having first, second, third, fourth, fifth and sixth inputs respectively connected to one sixth, eighth, tenth, twelfth, fourteenth and sixteenth outputs of said four line to sixteen line decoder and an output; a JK Flip-Flop having a preset input connected to the first output of said four line to sixteen line decoder, a clear input connected to the fourth output of said four line to sixteen line decoder and an output connected to the second input of said first AND gate;
a NAND gate having first and second inputs connected to the output of second AND gate and an output electrically coupled to said beamwidth and scan generating means; and
a fourth AND gate having first and second inputs connected to the output of second AND gate and an output electrically coupled to said beamwidth and scan generating means.

7. The system of claim 1 wherein said beamwidth and scan generating means comprises:
means for generating a 1.024 millisecond, a 2.048 millisecond and a 131.072 millisecond clock signal;
a first NAND gate having a first input for receiving said 1.024 millisecond clock signal, a second input electrically coupled to said sequencing means and an output;
a first OR gate having a first input electrically coupled to said sequencing means, a second input and an output;
a first AND gate having a first input connected to the output of said first NAND gate, a second input connected to the output of said first OR gate and an output;
an eight bit synchronous counter having eight inputs for receiving the scan data words and lobe data words provided by said memory means, a clock input connected to the output of said first AND gate, a load input and first and second outputs;
a first monostable multivibrator having an input electrically coupled to said sequencing means and an output;
a second monostable multivibrator having an input electrically coupled to said sequencing means and an output;

a third monostable multivibrator having an input connected to the first output of said eight bit synchronous counter and an output electrically coupled to said sequencing means;

a second OR gate having a first input connected to the output of said first monostable multivibrator, a second input connected to the output of said second monostable multivibrator and an output;

a second NAND gate having first and second inputs connected to the output of said second OR gate and an output connected to the load input of said eight bit synchronous counter;

a second AND gate having a first input for receiving said 2.048 millisecond clock signal, a second input connected to the second output of said eight bit synchronous counter and an output;

a third NAND gate having first and second inputs connected to the second output of said eight bit synchronous counter and an output;

a third AND gate having a first input for receiving said 131.072 millisecond clock signal, a second input connected to the second output of said third NAND gate and an output; and a third OR gate having a first input connected to the output of said second AND gate, a second input connected to the output of said third AND gate and an output connected to the second input of said first OR gate.

8. The system of claim 1 wherein said control register means comprises a first and second presettable binary latches, said first and second latches each having four data inputs, a load input and four data outputs.

9. The system of claim 1 wherein said thumbwheel switching means comprises three thumbwheel switches coded in hexadecimal.

10. A digital radar simulation system for simulating up to 2048 pre-programmed radar signatures, said digital radar simulation system comprising:

timing circuit means for providing a first clock signal, a second clock signal, a third clock signal, a fourth clock signal, a fifth clock signal and a sixth clock signal;

thumbwheel switching means for providing a plurality of digital logic signals, said digital logic signals being representative of 2048 pre-programmed radar signatures said digital radar simulation system simulates, said thumbwheel switching means upon being set to one of the 2048 radar signatures to be simulated providing the most significant bits of the digital address indicative of said radar signature;

sequencing means for providing the least significant bits of said digital address indicative of said radar signature being simulated;

memory means for storing said 2048 radar signatures therein, said memory means in response to the address supplied by said thumbwheel switching means and said sequencing means providing an eight bit control word, a pair of pulse repetition interval data words, a plurality of lobe data words and a plurality of scan data words for the radar signature being simulated;

said memory means not providing said lobe data words and said scan data words when the radar signature being simulated by said digital radar simulation system is a direct scan radar signature;

control register means for receiving said eight bit control word and storing said control word therein while said radar signature is being simulated;

said sequencing means receiving said first clock signal and responsive to said first clock signal providing sequentially a control word signal, a pulse repetition interval signal and alternatively a plurality of lobe word signals and a plurality of scan word signals;

said control word pulse latching the eight bit control word into said control register means;

the first and second bits of said control word representing a pulse width for the radar signature being simulated;

pulse repetition interval and jitter generating means for receiving a pair of eight bit data words from said memory means, said first eight bit data word being the least significant bits of said pulse repetition interval and said second eight bit data word being the most significant bits of said pulse repetition interval, said pulse repetition interval and jitter generating means, responsive to said first and second data words generating a pulse repetition interval for the radar signature being simulated;

said pulse repetition interval and jitter generating means receiving the third, fourth and fifth bits of said control word and in response to the third fourth and fifth bits of s id control word providing a sixty four microsecond shortened time period for every other pulse repetition interval generated by said pulse repetition generating means, a one hundred twenty eight microsecond shortened time period for every other pulse repetition interval generated by said pulse repetition generating means, or a complete pulse repetition interval for two cycles followed by a sixty four microsecond shortened time period pulse repetition interval for one cycle and a one hundred twenty eight microsecond shortened time period pulse repetition interval for the next cycle;

beamwidth and scan generating means for generating a beamwidth and side lobes for the radar signature being simulated in response to the lobe data words supplied thereto by said memory means, said lobe data words being indicative of the beamwidth and side lobes of the radar signature being simulated;

said beamwidth and scan generating means generating a scan and scan period for the radar signature being simulated in response to the scan data words supplied thereto by said memory means;

frequency hop generating means for generating a frequency hop within the radar signature being simulated by said digital radar simulation system, said frequency hop being generated by said frequency hop generating means in response to the sixth bit of said control word; and output circuit means for receiving the seventh and eight bits of said control word, for providing in response to the seventh bit of said control word a direct scan radar signature and for providing in response to the eight bit of said control word a pulse group within the radar signature being simulated and for gating the pulse repetition interval, the frequency hop, the beamwidth, side lobes, scan and scan period into the radar signature being simulated by said digital radar simulation system.

11. The system of claim 10 wherein said memory means comprises an Erasable Programmable Read Only Memory.

12. The system of claim 10 wherein said pulse repetition interval and jitter generating means comprises:

first and second storage registers each having eight data inputs, a clock input, a load input and eight data outputs, the data inputs of said first storage register receiving the first of said pair of pulse repetition interval data words, the data inputs of said second register receiving the second of said pair of pulse repetition interval data words and the load input of said first and second storage registers receiving the pulse repetition interval signal generated by said sequencing means;

first and second counters having eight data inputs, a clock input, a load input and eight data outputs, each data input of said first counter being connected to one of the data outputs of said first storage register, each data input of said second counter being connected to one of the data outputs of said second storage register, the clock input of said first counter receiving the second clock signal from said timing circuit means, and the clock input of said second counter being connected to the eight data output of said first counter, said first and second counters being configured as a presettable binary counter;

a first AND gate having a first input connected to the eight data output of said first counter, a second input for receiving the third bit of said control word and an output;

a second AND gate having first, second, third and fourth inputs respectively connected to the first, second, third and fourth outputs of said second counter and an output;

a third AND gate having first, second, third and fourth inputs respectively connected to the fifth, sixth, seventh and eight outputs of said second counter and an output;

a first OR gate having a first input connected to the output of said first AND gate, a second input for receiving the fourth bit of said control word and an output;

a second OR gate having a first input for receiving the seventh bit of said control word, a second input for receiving said plurality of scan word signals and an output electrically to said output circuit means;

a fourth AND gate having a first input connected to the output of said second AND gate, a second input connected to the output of said third AND gate and an output;

a fifth AND gate having a first input connected to the output of said second AND gate, a second input connected to the output of said third AND gate, a third input connected to the output of said first OR gate, a fourth input and an output;

a sixth AND gate having a first input connected to the output of said fourth AND gate, a second input connected to the output of said first OR gate, a third input connected to the output of said first AND gate, a fourth input and an output;

a third OR gate having a first input connected to the output of said fifth AND gate, a second input connected to the output of said sixth AND gate and an output;

a NAND gate having a pair of inputs connected to the output of said third OR gate;

a seventh AND gate having a first input connected to the output of said NAND gate, a second input connected to the eighth output of said second counter and an output;

a first monostable multivibrator having an input connected to the output of said eighth AND gate, a Q output electrically coupled to said output circuit means and a not Q output;

a second monostable multivibrator having an input connected to the output of said first monostable multivibrator and a not Q output connected to the load inputs of said first and second counters;

a first JK Flip-Flop having a clock input connected to the Q output of said first monostable multivibrator, a Q output and a not Q output;

a second JK Flip-Flop having a clock input connected to the Q output of said first JK Flip-Flop, a clear input electrically coupled to said control register means, a Q output connected to the fourth input of said sixth NAND gate and a not Q output;

an eight AND gate having a first input connected to the not Q output of said first JK Flip-Flop, a second input connected to the not Q output of said second JK Flip-Flop and an output connected to the fourth input of said sixth AND gate; and a ninth AND gate having a first input for receiving said third clock signal, a second input for receiving the fifth bit of said control word and an output connected to the clock input of said first storage register.

13. The system of claim 10 wherein said control register means comprises:

a first and second control registers each having four data inputs, a load input and four data outputs, each input of said registers receiving one of the bits of said control word and the load inputs of said registers receiving the control word signal from said sequencing means; and an AND gate having first and second inputs respectively connected to the first and second outputs of said control register.

14. The system of claim 10 wherein said sequencing means comprises:

a first AND gate having a first input for receiving said first clock signal, a second input and an output;

an OR gate having a first input connected to the output of said first AND gate, a second input electrically coupled to said beamwidth and scan generating means and an output;

a synchronous binary counter having a clock input connected to the output of said OR gate, a clear input and first, second, third and fourth outputs;

a four line to sixteen line decoder having first, second, third and fourth inputs respectively connected to the first, second, third and fourth outputs of said synchronous binary counter and sixteen outputs;

a first monostable multivibrator having an input connected to the first output of said four line to sixteen line decoder, and an output connected to the clear input of said synchronous binary counter;

the output of said first monostable multivibrator being electrically coupled to said output circuit means;

a second monostable multivibrator having an input connected to the third output of said four line to sixteen line decoder, and an output electrically coupled to said pulse repetition interval means;

a third monostable multivibrator having an input connected to the fourth output of said four line to sixteen line decoder, and an output electrically coupled to said pulse repetition interval means;

a second AND gate having first, second, third, fourth, fifth and sixth inputs respectively connected to the fifth, seventh, ninth, eleventh, thirteenth and fifteenth outputs of said four line to sixteen line decoder and an output;

a third AND gate having first, second, third, fourth, fifth and sixth inputs respectively connected to the sixth, eighth, tenth, twelfth, fourteenth and sixteenth outputs of said four line to sixteen line decoder and an output; a JK Flip-Flop having a preset input connected to the first output of said four line to sixteen line decoder, a clear input connected to the fourth output of said four line to sixteen line decoder and an output connected to the second input of said first AND gate;

a NAND gate having first and second inputs connected to the output of second AND gate and an output electrically coupled to said beamwidth and scan generating means; and a fourth AND gate having first and second inputs connected to the output of second AND gate and an output electrically coupled to said beamwidth and scan generating means.

15. The system of claim 10 wherein said beamwidth and scan generating means comprises:

a first NAND gate having a first input for receiving said fourth clock signal, a second input electrically coupled to said sequencing means and an output;

a first OR gate having a first input electrically coupled to said sequencing means, a second input and an output;

a first AND gate having a first input connected to the output of said first NAND gate, a second input connected to the output of said first OR gate and an output;

an eight bit synchronous counter having eight inputs for receiving the scan data words and lobe data words provided by said memory means, a clock input connected to the output of said first AND gate, a load input and first and second outputs;

a first monostable multivibrator having an input electrically coupled to said sequencing means and an output;

a second monostable multivibrator having an input electrically coupled to said sequencing means and an output;

a third monostable multivibrator having an input connected to the first output of said eight bit synchronous counter and an output electrically coupled to said sequencing means;

a second OR gate having a first input connected to the output of said first monostable multivibrator, a second input connected to the output of said second monostable multivibrator and an output;

a second NAND gate having first and second inputs connected to the output of said second OR gate and an output connected to the load input of said eight bit synchronous counter;

a second AND gate having a first input for receiving said fifth clock signal, a second input connected to the second output of said eight bit synchronous counter and an output;

a third NAND gate having first and second inputs connected to the second output of said eight bit synchronous counter and an output;

a third AND gate having a first input for receiving said sixth clock signal, a second input connected to the second output of said third NAND gate and an output; and a third OR gate having a first input connected to the output of said second AND gate, a second input connected to the output of said third AND gate and an output connected to the second input of said first OR gate.

* * * * *